US009860399B2

United States Patent
Nishimura et al.

(10) Patent No.: US 9,860,399 B2
(45) Date of Patent: Jan. 2, 2018

(54) IMAGE FORMING APPARATUS, REMOTE CONTROL METHOD, AND NON-TRANSITORY COMPUTER-READABLE RECORDING MEDIUM ENCODED WITH REMOTE CONTROL PROGRAM

(71) Applicant: KONICA MINOLTA, INC., Chiyoda-ku (JP)

(72) Inventors: Ryosuke Nishimura, Toyokawa (JP); Yoichi Kurumasa, Toyokawa (JP); Yoshiyuki Tamai, Toyohashi (JP); Mie Kawabata, Toyokawa (JP); Mitsutaka Morita, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/488,383

(22) Filed: Sep. 17, 2014

(65) Prior Publication Data
US 2015/0077787 A1 Mar. 19, 2015

(30) Foreign Application Priority Data
Sep. 17, 2013 (JP) ................................. 2013-191400

(51) Int. Cl.
G06F 15/00 (2006.01)
H04N 1/00 (2006.01)
(Continued)

(52) U.S. Cl.
CPC ..... *H04N 1/00352* (2013.01); *G03G 15/5075* (2013.01); *G06F 3/1203* (2013.01);
(Continued)

(58) Field of Classification Search
CPC ........... H04N 1/00352; H04N 1/00127; H04N 1/00233; H04N 1/00307; H04N 1/00408;
(Continued)

(56) References Cited

U.S. PATENT DOCUMENTS 5,477,476 A * 12/1995 Schanin et al. ............... 713/324
6,307,643 B1 10/2001 Okada et al.
(Continued)

FOREIGN PATENT DOCUMENTS

CN            101675422         3/2010
CN            101771784         7/2010
(Continued)

OTHER PUBLICATIONS

Extended European Search Report issued in corresponding European Patent Application No. 14184735.0-1957, dated Feb. 6, 2015.
(Continued)

*Primary Examiner* — Mark Milia
(74) *Attorney, Agent, or Firm* — Buchanan Ingersoll & Rooney PC

(57) ABSTRACT

An image forming apparatus includes: a path establishing portion to establish a communication path with a remote operation device; an active device setting portion to set the remote operation device with which the communication path is established to be an active device; a process execution portion to execute a process in accordance with a remote operation received from the active device; and a standby device setting portion to, in response to a communication path being established with another remote operation device, set another remote operation device to be a standby device. The active device setting portion includes a sequential setting portion to, in response to detection of an end state in which no remote operation is received from the active device, set the standby device to be an active device.

22 Claims, 16 Drawing Sheets

(51) Int. Cl.
*G03G 15/00* (2006.01)
*G06F 3/12* (2006.01)
*H04W 76/06* (2009.01)

(52) U.S. Cl.
CPC .......... *G06F 3/1204* (2013.01); *G06F 3/1207* (2013.01); *G06F 3/1229* (2013.01); *G06F 3/1236* (2013.01); *G06F 3/1239* (2013.01); *G06F 3/1259* (2013.01); *G06F 3/1292* (2013.01); *H04N 1/00127* (2013.01); *H04N 1/00233* (2013.01); *H04N 1/00307* (2013.01); *H04N 1/00408* (2013.01); *H04N 1/00896* (2013.01); *H04N 1/00954* (2013.01); *H04N 1/00973* (2013.01); *H04W 76/066* (2013.01); *H04N 2201/0075* (2013.01); *H04N 2201/0094* (2013.01); *H04N 2201/0096* (2013.01)

(58) Field of Classification Search
CPC .......... H04N 1/00896; H04N 1/00954; H04N 1/00973; G03G 15/5075; G06F 3/1203; G06F 3/1204; G06F 3/1207; G06F 3/1229; G06F 3/1236; G06F 3/1239; G06F 3/1259; G06F 3/1292; H04W 76/066
USPC ....................................................... 358/1.14
See application file for complete search history.

(56) References Cited

U.S. PATENT DOCUMENTS

| | | | |
|---|---|---|---|
| 6,396,592 | B1 | 5/2002 | Okada et al. |
| 6,791,703 | B1 | 9/2004 | Maeda et al. |
| 2002/0063886 | A1* | 5/2002 | Johnson ................ 358/1.15 |
| 2002/0142720 | A1 | 10/2002 | Russell et al. |
| 2003/0225946 | A1* | 12/2003 | Allen ............... H04N 1/32122 710/8 |
| 2006/0244998 | A1* | 11/2006 | Salgado ................ 358/1.16 |
| 2007/0081186 | A1* | 4/2007 | Numata ................ 358/1.15 |
| 2007/0229896 | A1* | 10/2007 | Fujimori .............. G06F 3/1205 358/1.16 |
| 2008/0270525 | A1 | 10/2008 | Thero et al. |
| 2009/0019187 | A1 | 1/2009 | Okuma |
| 2010/0167651 | A1 | 7/2010 | Sakuda et al. |
| 2012/0069380 | A1 | 3/2012 | Sugimoto |
| 2012/0146775 | A1 | 6/2012 | Kudo et al. |
| 2012/0320421 | A1* | 12/2012 | Van Vonderen ... H04N 1/32486 358/1.15 |

FOREIGN PATENT DOCUMENTS

| | | |
|---|---|---|
| JP | 11-327861 A | 11/1999 |
| JP | 2002-112356 A | 4/2002 |
| JP | 2003-224568 A | 8/2003 |
| JP | 2004-222310 A | 8/2004 |
| JP | 2007-280211 A | 10/2007 |
| JP | 2009-200973 A | 9/2009 |
| JP | 2011-035581 A | 2/2011 |
| JP | 2012-070068 A | 4/2012 |
| JP | 2012-093940 A | 5/2012 |
| JP | 2013-055562 A | 3/2013 |
| JP | 2013-065197 A | 4/2013 |
| JP | 2013-162387 A | 8/2013 |
| WO | 2006-082782 A1 | 8/2006 |

OTHER PUBLICATIONS

Office Action (Notice of Ground of Rejection) dated Jul. 21, 2015, by the Japanese Patent Office in corresponding Japanese Patent Application No. 2013-191400, and an English Translation of the Office Action. (16 pages).

Notification of the First Office Action issued in corresponding Chinese Patent Application No. 201410471209.6, dated Mar. 3, 2017, with English Translation (28 pages).

* cited by examiner

F I G. 1
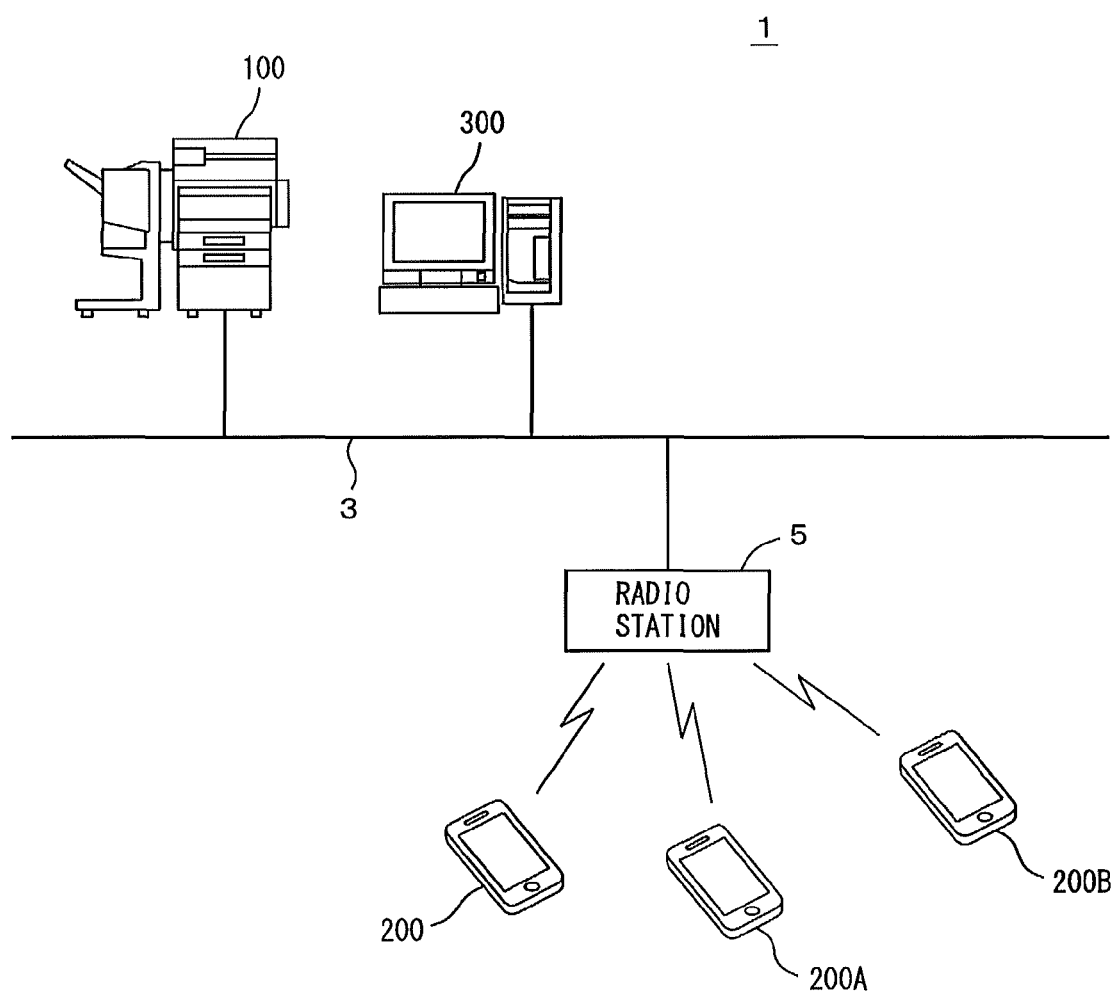

IMAGE FORMING APPARATUS, REMOTE CONTROL METHOD, AND NON-TRANSITORY COMPUTER-READABLE RECORDING MEDIUM ENCODED WITH REMOTE CONTROL PROGRAM

This application is based on Japanese Patent Application No. 2013-191400 filed with Japan Patent Office on Sep. 17, 2013, the entire content of which is hereby incorporated by reference.

BACKGROUND OF THE INVENTION

Field of the Invention

The present invention relates to an image forming apparatus, a remote control method, and a non-transitory computer-readable recording medium encoded with a remote control program, and particularly to an image forming apparatus remotely controlled by a remote operation device, a remote control method executed in the image forming apparatus, and a non-transitory computer-readable recording medium encoded with a remote control program.

Description of the Related Art

Techniques for remotely operating MFPs (Multi Function Peripherals) with portable information devices such as smart phones are known. For example, Japanese Patent Laid-Open No. 2012-93940 discloses a remote operation system including an operated terminal and a portable terminal. The operated terminal includes a display screen controller that creates a portable terminal screen by modifying an operated terminal screen based on display attribute information of the portable terminal, an encoding unit that encodes the portable terminal screen by an encoding method received from the portable terminal, and an operation processing unit that executes a specified operation with positional information received from the portable terminal. The portable terminal includes a decoding unit that decodes the encoded portable terminal screen and outputs the decoded portable terminal screen to a touch screen, and a positional information correction unit that corrects positional information indicating a touch position on the portable terminal screen to positional information on the operated terminal screen, based on the display attribute information of the portable terminal itself and display attribute information of the operated terminal that is received from the operated terminal, in response to detection of a touch operation on the touch screen displaying the portable terminal screen.

However, a single portable information terminal alone can remotely operate an MFP. An MFP capable of being used by multiple people may be accessed by a plurality of portable information devices operated by multiple people. In this case, the MFP is remotely controlled by one of the portable information devices. In order to remotely control the MFP, the users who operate the other portable information devices have to operate their portable information devices after a while. Moreover, next time one of the users is about to remotely operate the MFP from his/her portable information device, another user may be remotely operating the MFP. In this case, the user cannot remotely operate the MFP for an indefinitely long time.

SUMMARY OF THE INVENTION

According to an aspect of the present invention, an image forming apparatus includes: a path establishing portion to, in response to a connection request being received from a remote operation device, establish a communication path with the remote operation device; an active device setting portion to set the remote operation device with which the communication path is established to be an active device; a process execution portion to execute a process in accordance with a remote operation received from the remote operation device set as an active device; and a standby device setting portion to, in response to a communication path being established by the path establishing portion with another remote operation device different from the remote operation device set as an active device, set another remote operation device different from the remote operation device set as an active device to be a standby device. The active device setting portion includes a sequential setting portion to, in response to detection of an end state in which no remote operation is received from the remote operation device set as an active device, set the remote operation device set as a standby device to be an active device.

In accordance with another aspect of the present invention, a remote control method allows the image forming apparatus to perform: a path establishing step of, in response to a connection request being received from a remote operation device, establishing a communication path with the remote operation device; an active device setting step of setting the remote operation device with which the communication path is established to be an active device; a process execution step of executing a process in accordance with a remote operation received from the remote operation device set as an active device; and a standby device setting step of, in response to a communication path being established in the path establishing step with another remote operation device different from the remote operation device set as an active device, setting another remote operation device different from the remote operation device set as an active device to be a standby device. The active device setting step includes a sequential setting step of, in response to detection of an end state in which no remote operation is received from the remote operation device set as an active device, setting the remote operation device set as a standby device to be an active device.

In accordance with a further aspect of the present invention, a non-transitory computer-readable recording medium is encoded with a remote control program executed by a computer controlling an image forming apparatus. The remote control program causes the computer to perform: a path establishing step of, in response to a connection request being received from a remote operation device, establishing a communication path with the remote operation device; an active device setting step of setting the remote operation device with which the communication path is established to be an active device; a process execution step of executing a process in accordance with a remote operation received from the remote operation device set as an active device; and a standby device setting step of, in response to a communication path being established in the path establishing step with another remote operation device different from the remote operation device set as an active device, setting another remote operation device different from the remote operation device set as an active device to be a standby device. The active device setting step includes a sequential setting step of, in response to detection of an end state in which no remote operation is received from the remote operation device set as an active device, setting the remote operation device set as a standby device to be an active device.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 1 is a diagram showing an overview of a print system in an embodiment of the present invention.

DESCRIPTION OF THE PREFERRED EMBODIMENTS

Figure 2:
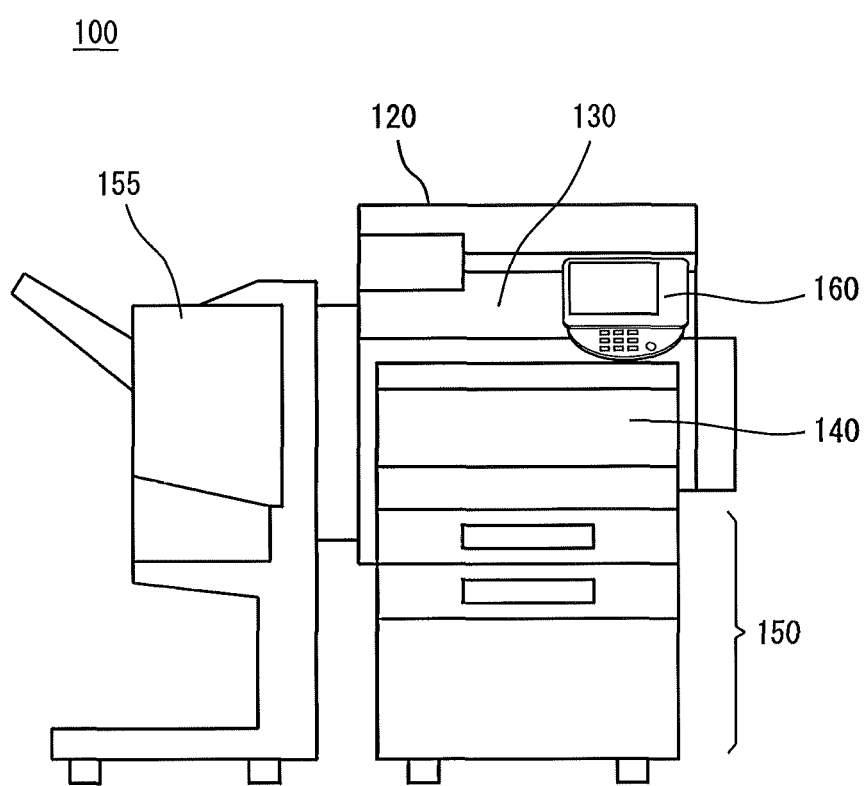
FIG. 2 is an external perspective view of an MFP.

Embodiments of the present invention will be described below with reference to the figures. In the following description, the same parts are denoted with the same reference signs. Their names and functions are also the same, and a detailed description thereof will not be repeated.

FIG. 1 is a diagram showing an overview of a print system in an embodiment of the present invention. Referring to FIG. 1, print system 1 includes a Multi Function Peripheral (hereinafter referred to as "MFP") 100 functioning as an image processing apparatus, a personal computer (hereinafter referred to as "PC") 300, a radio station 5, and portable information devices 200, 200A, 200B. MFP 100, PC 300, and radio station 5 are connected to a network 3. Portable information devices 200, 200A, 200B are connected to network 3 through radio station 5.

Network 3 is a Local Area Network (LAN), either wired or wireless. Network 3 is not limited to a LAN but may be a Wide Area Network (WAN), a Public Switched Telephone Network (PSTN), or the Internet.

PC 300 is a general computer. PC 300 is installed with a printer driver program compatible with MFP 100 and executes the printer driver program to control MFP 100 so that MFP 100 executes an image forming process, a document scan process, and other processes.

Portable information devices 200, 200A, 200B are computers such as smart phones and PDAs (Personal Digital Assistants) carried and used by users. Portable information devices 200, 200A, 200B have the same hardware configuration and functions, and portable information device 200 will be taken as an example in the description here, unless otherwise specified. Here, portable information device 200 is a smart phone and has a wireless LAN function and a call function. Portable information device 200 thereby can connect to a mobile phone network to make a call by communicating with a mobile phone base station by radio.

In print system 1 in the present embodiment, portable information device 200 is installed with a remote operation program for remotely controlling MFP 100, and when receiving a remote operation input by the user operating portable information device 200, transmits a remote control command to MFP 100. MFP 100 is installed with a remote control program for receiving a remote control command from portable information device 200 and executing a process in accordance with the received remote control command. In the present embodiment, a remote operation program for remotely controlling MFP 100 is installed in portable information device 200, by way of example. However, the remote operation program for remotely controlling MFP 100 may be installed in PC 300. In this case, the user can remotely control MFP 100 using PC 300 in the same manner as when remotely controlling MFP 100 using portable information device 200.

Figure 3:
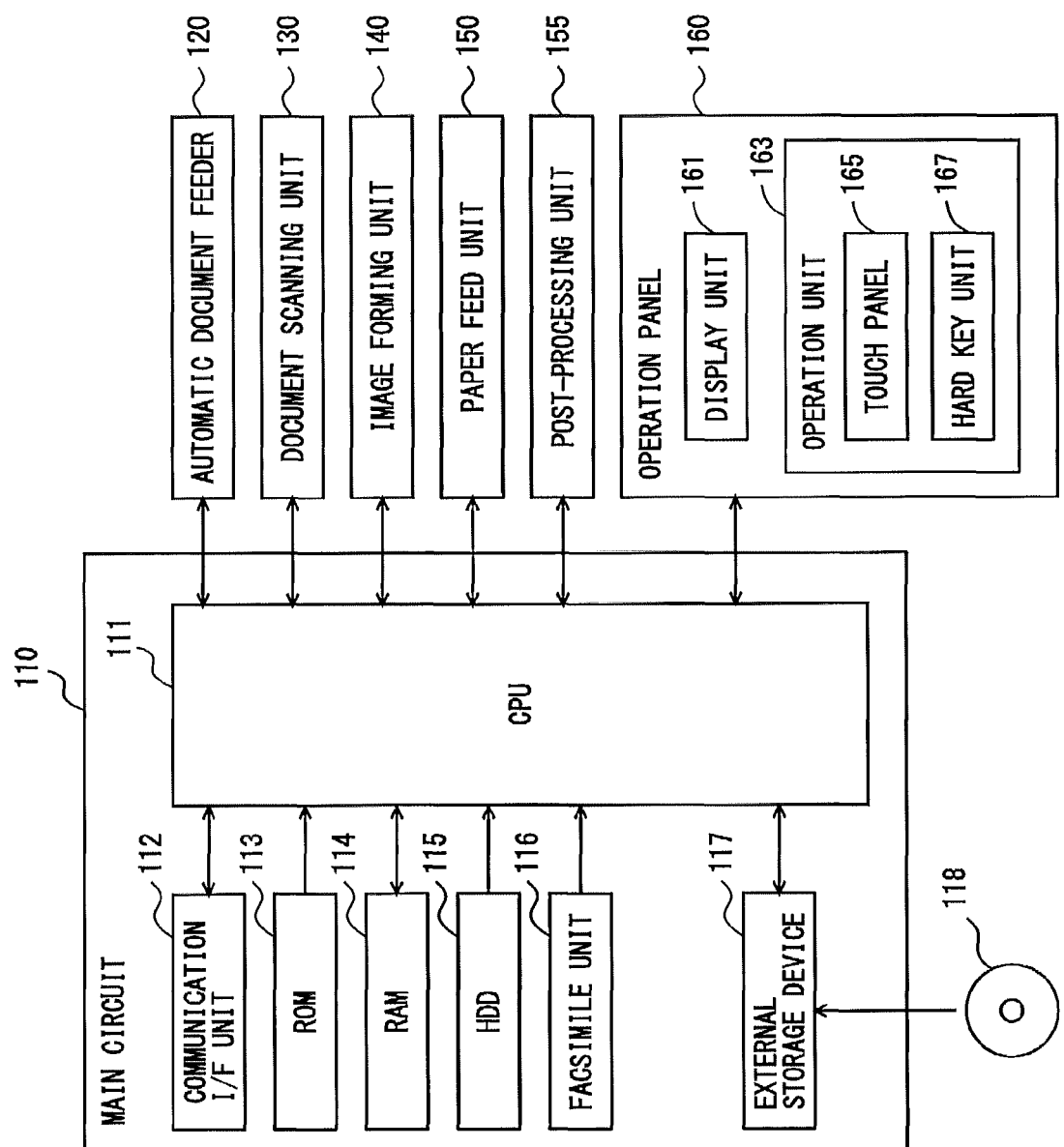
FIG. 3 is a block diagram showing an overview of a hardware configuration of the MFP.

FIG. 2 is an external perspective view of the MFP. FIG. 3 is a block diagram showing an overview of a hardware configuration of the MFP. Referring to FIG. 2 and FIG. 3, MFP 100 includes a main circuit 110, a document scanning unit 130 for scanning a document, an automatic document feeder 120 for conveying a document to document scanning unit 130, an image forming unit 140 for forming an image on paper based on image data output by document scanning unit 130 scanning a document, a paper feed unit 150 for supplying paper to image forming unit 140, a post-processing unit 155 for processing paper having an image formed thereon, and an operation panel 160 as a user interface.

Post-processing unit 155 executes a sorting process of sorting one or more sheets of paper having an image formed thereon by image forming unit 140 and discharging the sorted paper, a punching process of forming punch holes, and a stapling process of stapling paper.

Main circuit 110 includes a CPU 111, a communication interface (I/F) unit 112, a ROM 113, a RAM 114, a Hard Disk Drive (HDD) 115 as a mass storage device, a facsimile unit 116, and an external storage device 117 to which a CD-ROM 118 is attached. CPU 111 is connected to automatic document feeder 120, document scanning unit 130, image forming unit 140, paper feed unit 150, post-processing unit 155, and operation panel 160 to centrally control MFP 100.

ROM 113 stores a program executed by CPU 111 or data necessary to execute the program. RAM 114 is used as a work area when CPU 111 executes a program. RAM 114 temporarily stores scan data (image data) successively sent from document scanning unit 130.

Operation panel 160 is provided on the top surface of MFP 100 and includes a display unit 161 and an operation unit 163. Display unit 161 is a display device such as an LCD (Liquid Crystal Display) or an organic ELD (Electro-Luminescence Display) and displays instruction menus to users, information about the acquired image data, and other information. Operation unit 163 includes a hard key unit 167 including a plurality of keys and accepts input of a variety of instructions and data such as characters and numerals through the user's operation corresponding to the keys. Operation unit 163 further includes a touch panel 165 provided on display unit 161.

Communication I/F unit 112 is an interface for connecting MFP 100 to network 3. CPU 111 communicates with PC 300 or portable information device 200, 200A, 200B through communication I/F unit 112 to transmit/receive data. Communication I/F unit 112 can also communicate with a computer connected to the Internet through network 3.

Facsimile unit 116 is connected to a PSTN to transmit facsimile data to the PSTN or receive facsimile data from the PSTN. Facsimile unit 116 stores the received facsimile data into HDD 115 or outputs it to image forming unit 140. Image forming unit 140 prints the facsimile data received from facsimile unit 116 on paper. Facsimile unit 116 also converts data stored in HDD 115 into facsimile data and transmits the converted facsimile data to a facsimile machine connected to the PSTN.

CD-ROM (Compact Disk ROM) 118 is attached to external storage device 117. CPU 111 can access CD-ROM 118 through external storage device 117. CPU 111 loads the program recorded on CD-ROM 118 attached to external storage device 117 into RAM 114 for execution. The program executed by CPU 111 can be stored not only in CD-ROM 118 but also in other medium such as an optical disk (MO (Magnetic Optical Disc)/MD (Mini Disc)/DVD (Digital Versatile Disc)), an IC card, an optical card, and a semiconductor memory such as a mask ROM, an EPROM (Erasable Programmable ROM), and an EEPROM (Electrically EPROM).

The program executed by CPU 111 is not limited to a program recorded on CD-ROM 118. A program stored in HDD 115 may be loaded into RAM 114 for execution. In this case, another computer connected to network 3 may overwrite the program stored in HDD 115 of MFP 100 or additionally write a new program. MFP 100 may download a program from another computer connected to network 3 and store the program into HDD 115. The program referred to here includes not only a program directly executable by CPU 111 but also a source program, a compressed program, and an encrypted program.

Figure 4:
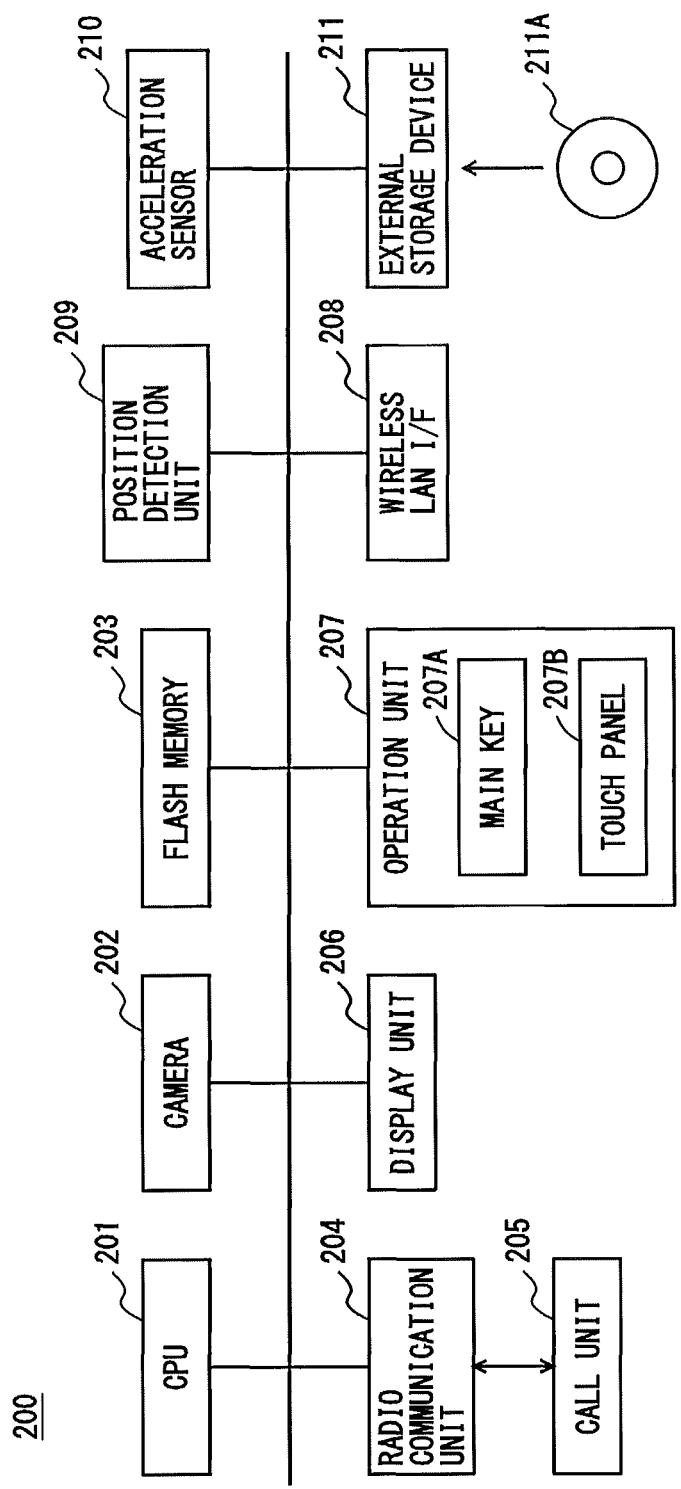
FIG. 4 is a block diagram showing an overview of a hardware configuration of a portable information device.

FIG. 4 is a block diagram showing an overall hardware configuration of the portable information device. Referring to FIG. 4, portable information device 200 in the present embodiment includes a CPU 201 for centrally controlling portable information device 200, a camera 202, a flash memory 203 for storing data in a nonvolatile manner, a radio communication unit 204 connected to a call unit 205, a display unit 206 displaying information, an operation unit 207 accepting the user's operation, a wireless LAN I/F 208, a position detection unit 209, an acceleration sensor 210, and an external storage device 211.

Display unit 206 is a display device such as an LCD or an organic ELD and displays instruction menus to users, information about the acquired image data, and other information. Operation unit 207 includes a main key 207A and a touch panel 207B. When the user points on the display surface of display unit 206, operation unit 207 outputs the position in the display surface detected by touch panel 207B to CPU 201. CPU 201 detects the position pointed by the user in the screen appearing on display unit 206, based on the position detected by touch panel 207B. CPU 201 accepts input of a variety of instructions and data such as characters and numerals through the user's operation, based on the screen appearing on display unit 206 and the position detected by touch panel 207B. For example, when a screen including a ten-key image appears on display unit 206, the number corresponding to the key displayed at the position detected by touch panel 207B is accepted.

Camera 202 includes a lens and an optoelectronic transducer, and light collected by the lens is imaged on the optoelectronic transducer. The optoelectronic transducer transduces the received light and outputs image data to CPU 201. Examples of the optoelectronic transducer include a CMOS (Complementary Metal Oxide Semiconductor) sensor and a CCD (Charge Coupled Device) sensor. Camera 202 is arranged at a position where its image capturing range includes the user who views display unit 206. Specifically, camera 202 has its optical axis approximately parallel to the normal to the display surface of display unit 206 and is arranged such that the image capturing direction is coincident with the direction of the display surface. In other words, camera 202 has the image capturing range including the user who views display unit 206.

Radio communication unit 204 communicates by radio with a mobile phone base station connected to a telephone communication network. Radio communication unit 204 connects portable information device 200 to the telephone communication network to enable a call using call unit 205. Radio communication unit 204 decodes a voice signal obtained by demodulating a radio signal received from a mobile phone base station and outputs the decoded signal to call unit 205. Radio communication unit 204 encodes voice input from call unit 205 and transmits the encoded signal to a mobile phone base station. Call unit 205 includes a microphone and a speaker. Voice input from radio communication unit 204 is output from the speaker, and voice input from the microphone is output to radio communication unit 204. Radio communication unit 204 is controlled by CPU 201 and connects portable information device 200 to an email server to transmit/receive an email.

Wireless LAN I/F 208 is an interface which communicates with radio station 5 to connect portable information device 200 to network 3. The respective IP (Internet Protocol) addresses of PC 300 and MFP 100 are registered in portable information device 200, so that portable information device 200 can communication with PC 300 and MFP 100 to transmit/receive data. In the present embodiment, portable information device 200 uses wireless LAN I/F 208 to communication with PC 300 and MFP 100, by way of example. However, any other communication scheme may be used to communicate with them. Specifically, in a case where portable information device 200, PC 300, and MFP 100 are installed with a near field communication device, for example, such as Bluetooth (R), portable information device 200 may perform one-to-one communication with PC 300 or MFP 100.

Flash memory 203 stores a program executed by CPU 201 or data necessary to execute the program. CPU 201 loads the program recorded in flash memory 203 into the RAM of CPU 201 for execution.

Position detection unit 209 detects the current position of portable information device 200. Specifically, position detection unit 209 is a GPS (Global Positioning System) receiver and receives radio waves from GPS satellites to measure the current position. Position detection unit 209 outputs a value indicating the measured current position, for example, the latitude and longitude to CPU 201.

Acceleration sensor 210 detects an acceleration of portable information device 200. Acceleration sensor 210 outputs the detected acceleration to CPU 201.

External storage device 211 is removable from portable information device 200. A CD-ROM 211A encoded with a remote operation program can be attached. CPU 201 can access CD-ROM 211A through external storage device 211. CPU 201 can load the remote operation program recorded on CD-ROM 211A attached to external storage device 211 into the RAM of CPU 201 for execution.

The program recorded in flash memory 203 or CD-ROM 210A has been described as a program executed by CPU 201. However, another computer connected to network 3 may overwrite the program stored in flash memory 203 or additionally write a new program. Portable information device 200 may download a program from another computer connected to network 3. The program referred to here includes not only a program directly executable by CPU 201 but also a source program, a compressed program, and an encrypted program.

The program executed by CPU 201 may be stored not only in CD-ROM 211A but also in other medium such as an optical disk (MO/MD/DVD), an IC card, an optical card, and a semiconductor memory such as a mask ROM, an EPROM, and an EEPROM.

Figure 5:
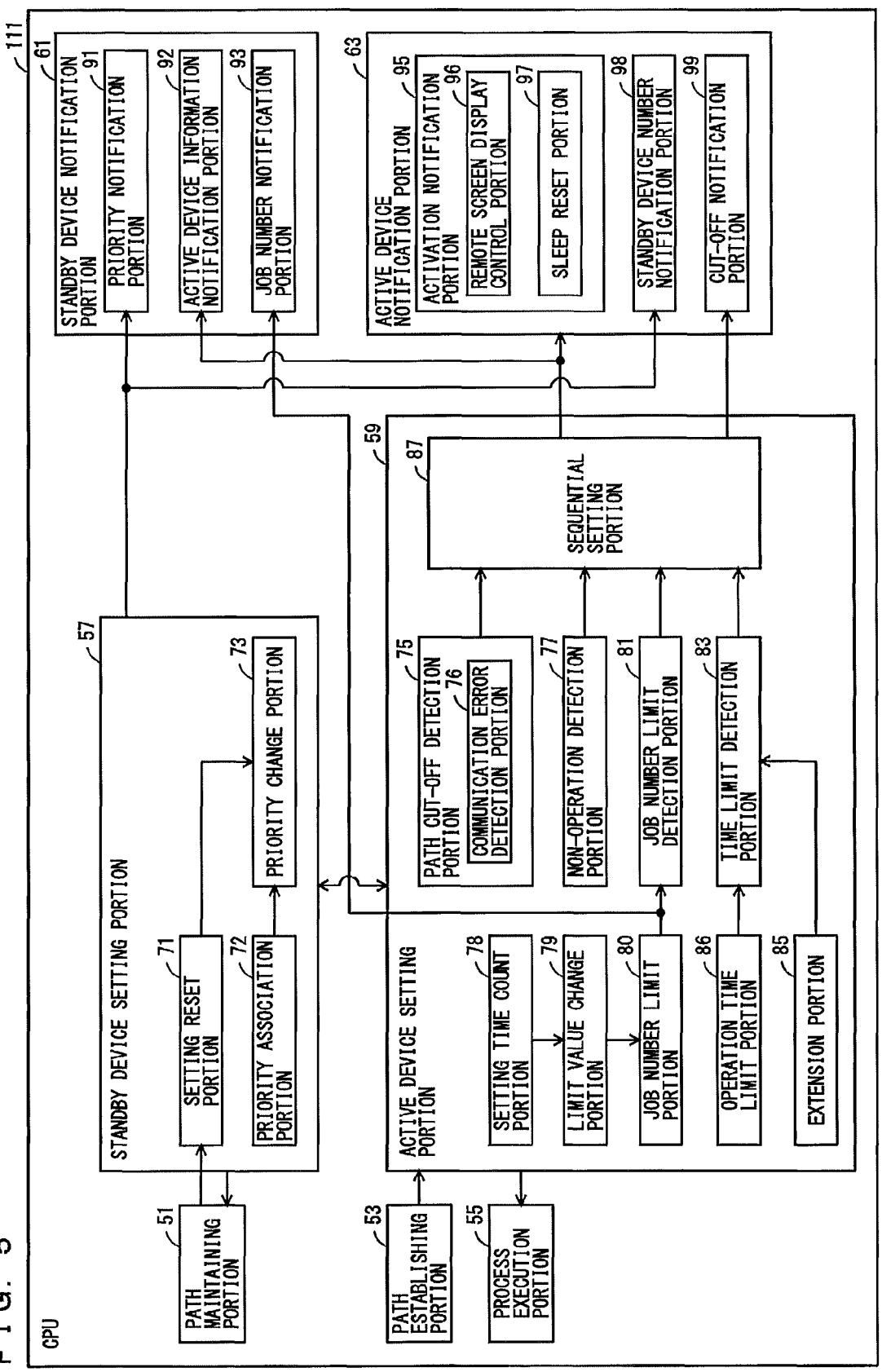
FIG. 5 is a block diagram showing an example of functions of the CPU of the MFP.

FIG. 5 is a block diagram showing an example of functions of the CPU of the MFP. The functions shown in FIG. 5 are formed in CPU 111 by CPU 111, of MFP 100 executing a remote control program stored in ROM 113, HDD 115, or CD-ROM 118. Referring to FIG. 5, CPU 111 includes a path establishing portion 53 for establishing a communication path with a device on the other end of communication, a path maintaining portion 51 for maintaining a communication path, a process execution portion 55 for executing a process, a standby device setting portion 57, an active device setting portion 59, a standby device notification portion 61, and an active device notification portion 63.

When communication I/F unit 112 receives a connection request from an external remote operation device, path establishing portion 53 negotiates with the external device and establishes a communication path for communicating with the remote operation device. Identification information for identifying a communication path is called a session number. When establishing a communication path with a remote operation device, path establishing portion 53 outputs a set of the device identification information for identifying the remote operation device and the session number of the communication path to active device setting portion 59.

Active device setting portion 59 sets the remote operation device specified by the device identification information to be an active device in response to input of a set of the device identification information and the session number from path establishing portion 53. For example, when path establishing portion 53 establishes a communication path with portable information device 200, a set of the device identification information of portable information device 200 and the session number of the communication path is input. In this case, portable information device 200 is set as an active device. Specifically, a set of the device identification information of the remote operation device set as an active device and the session number is stored into RAM 114.

Active device setting portion 59 outputs a remote operation received from the remote operation device set as an active device to process execution portion 55. Active device setting portion 59 accepts a remote operation received by communication I/F unit 112 from the remote operation device set as an active device. Specifically, of communication packets received by communication I/F unit 112, a communication packet having the same session number as the session number corresponding to the remote operation device set as an active device is determined to be the communication packet transmitted by the remote operation device set as an active device. Active device setting portion 59 specifies a remote operation based on the communication packet transmitted by the remote operation device set as an active device and outputs the specified remote operation to process execution portion 55.

Process execution portion 55 executes a process in accordance with the remote operation input from active device setting portion 59. The remote operation includes a setting operation for setting a setting value and an execution instruction operation of giving an instruction to execute a process. When a remote operation of a setting operation is input, process execution portion 55 changes a setting value for executing a process in accordance with the setting operation. When a remote operation of an execution instruction operation is input, process execution portion 55 executes a process specified by the execution instruction operation in accordance with a setting value. The process executed by process execution portion 55 in accordance with the execution instruction operation includes a scan process of scanning an image on a document by controlling automatic document feeder 120 and document scanning unit 130, an image forming process of forming an image on paper by controlling image forming unit 140, paper feed unit 150, and post-processing unit 155, a data management process of reading or writing data stored in HDD 115 or CD-ROM 118, a facsimile process of transmitting/receiving facsimile data by controlling facsimile unit 116, and a data transmission/reception process of transmitting/receiving data by controlling communication I/F unit 112. The process executed by process execution portion 55 includes a combination of two or more processes described above. Examples thereof include a copy process which is a combination of a scan process and an image forming process, a scan-to-send process which is a combination of a scan process and a data transmission process for transmitting image data obtained by scanning a document image, and a scan to BOX process which is a combination of a scan process and a data management process for storing image data obtained by scanning a document image into HDD 115.

Active device setting portion 59 can set only a single active device. If a set of device identification information and a session number is input from path establishing portion 53 in a state in which an active device has already been set, active device setting portion 59 outputs the set of device identification information and a session number input from path establishing portion 53 to standby device setting portion 57 without setting the remote operation device specified by the device identification information input from path establishing portion 53 as an active device. For example, when path establishing portion 53 establishes a communication path with portable information device 200A, and active device setting portion 59 receives input of a set of the device identification information of portable information device 200A and the session number of the communication path from path establishing portion 53 in a state in which portable information device 200 is set as an active device, active device setting portion 59 outputs the set of the device identification information of portable information device 200A and the session number to standby device setting portion 57 without setting portable information device 200A as an active device.

In response to input of a set of device identification information and a session number from active device setting portion 59, standby device setting portion 57 sets a remote operation device specified by the device identification information to be a standby device and notifies the remote operation device specified by the device identification information that it has been set as a standby device. Specifically, the device identification information of the remote operation device set as a standby device is stored into RAM 114. Standby device setting portion 57 further controls communication I/F unit 112 to transmit a signal indicating the setting as a standby device through a communication path specified by the session number input from active device setting portion 59. The number of standby devices that can be set by standby device setting portion 57 is one or more. Standby device setting portion 57 outputs a set of the device identification information of the remote operation device set as a standby device and the session number to path maintaining portion 51.

In response to input of a set of the device identification information of the standby device and the session number from standby device setting portion 57, path maintaining portion 51 maintains the communication path identified by the session number without cutting it off, until the standby device identified by the device identification information is set as an active device by active device setting portion 59. Specifically, the session number of the communication path is stored to be associated with the device identification information of the remote operation device set as a standby device that is stored in RAM 114. Path maintaining portion 51 monitors a communication state of the maintained communication path. When a plurality of communication paths are maintained, path maintaining portion 51 monitors the respective communication states of the communication paths. If the communication state in a communication path enters a communication disabled state for a predetermined period of time, path maintaining portion 51 outputs a communication error signal including the session number of the communication path to standby device setting portion 57. If the communication disabled state is followed by a communication enabled state, path maintaining portion 51 maintains the communication path. If the communication disabled state continues over a predetermined period of time, the path maintaining portion 51 outputs a setting reset instruction including the session number of the communication path to standby device setting portion 57.

If communication path I/F unit 112 receives a remote operation while a communication path is being maintained, path maintaining portion 51 outputs a set of the session number of the communication path through which the remote operation has been received and the remote operation to standby device setting portion 57.

Standby device setting portion 57 includes a setting reset portion 71, a priority association portion 72, and a priority change portion 73. Setting reset portion 71 resets the setting as a standby device by deleting a remote operation device that satisfies a predetermined condition from remote operation devices set as standby devices. Setting reset portion 71 outputs a reset signal including the device identification information of the remote operation device reset from the setting as a standby device to priority change portion 73.

Setting reset portion 71 receives a cancel instruction from the remote operation device set as a standby device and then resets the setting as a standby device for the remote device that has transmitted the cancel instruction. Specifically, when a set of a session number and a remote operation is input from path maintaining portion 51, and if the remote operation indicates a cancel instruction, setting reset portion 71 deletes the remote operation device corresponding to the session number that makes a set with the remote operation, from the standby devices. In response to input of a setting reset instruction from path maintaining portion 51, setting reset portion 71 resets the setting as a standby device for the remote operation device corresponding to the session number included in the setting reset instruction. Specifically, a set of the device identification information and the session number of the remote operation device corresponding to the session number included in the setting reset instruction is erased from the sets of device identification information and a session number stored in RAM 114. In response to input of an active setting signal described later from active device setting portion 59, setting reset portion 71 resets the setting as a standby device for the remote operation device specified by the device identification information included in the active setting signal. The active setting signal is a signal indicating that the remote operation device specified by the device identification information included therein is set as an active device. When the setting as a standby device is reset, setting reset portion 71 outputs a reset signal to priority change portion 73. The reset signal includes the device identification information of the remote operation device reset from the setting as a standby device.

Priority association portion 72 associates priorities with a plurality of remote operation devices if a plurality of remote operation devices are set as standby devices. Specifically, priority association portion 72 associates a higher priority with a remote operation device specified by device identification information in the order in which a set of device identification information and a session number is input from active device setting portion 59. The priority thus indicates the ordinal position of the remote operation device to be set as an active device.

Priority change portion 73 changes the priority based on a communication state of the communication path maintained with a remote operation device. Specifically, in response to input of a communication error signal from path maintaining portion 51, priority change portion 73 changes the priority associated with the remote operation device corresponding to the session number included in the communication error signal to the lowest priority and raises the priority one level for the remote operation devices other than the remote operation device changed to the lowest priority. When a reset signal is input from setting reset portion 71, priority change portion 73 deletes the priority associated with the remote operation device specified by the device identification information included in the reset signal and raises the priority one level for the remote operation devices given the priorities lower than the deleted priority.

Every time the remote operation device is set as a standby device or every time the priority associated with the remote operation device set as a standby device is changed, standby device setting portion 57 outputs a set of the device identification information and the session number of each remote operation device set as a standby device to active device notification portion 63 and outputs a set of the device identification information, the session number, and the priority of each remote operation device set as a standby device to priority notification portion 91 and active device setting portion 59.

If there exists a remote operation device set as a standby device, active device setting portion 59 limits the time during which the remote operation device set as an active device is being set as an active device. The time during which the remote operation device set as an active device is being set as an active device may be limited when the number of remote operation devices set as standby devices is equal to or greater than a predetermined number. Active device setting portion 59 includes a path cut-off detection portion 75, a non-operation detection portion 77, a setting time count portion 78, a limit value change portion 79, a job number limit portion 80, a job number limit detection portion 81, a time limit detection portion 83, an operation time limit portion 86, an extension portion 85, and a sequential setting portion 87.

Path cut-off detection portion 75 outputs a setting instruction to sequential setting portion 87 when a communication path established with the remote operation device set as an active device is cut off. Cut-off of the communication path includes a case where the remote operation device set as an active device cuts off and a case where communication is disabled due to a poor communication state of a communication path. Path cut-off detection portion 75 includes a communication error detection portion 76. Communication error detection portion 76 monitors the communication state of the communication path established with the remote operation device set as an active device. Specifically, communication error detection portion 76 determines whether communication I/F unit 112 receives a packet including the session number of the communication path established with the remote operation device set as an active device. Communication error detection portion 76 detects a communication error if a packet including the session number for the active device fails to be received for a predetermined time. If communication error detection portion 76 detects a communication error, path cut-off detection portion 75 cuts off the communication path established with the remote operation device set as an active device and outputs a setting instruction to sequential setting portion 87.

When a remote operation is not received from the remote operation device set as an active device for a predetermined time, non-operation detection portion 77 detects a non-operation state in which no operation has been made by the remote operation device. Communication I/F unit 112 receives a remote operation through a communication path established with the remote operation device set as an active device. However, active device setting portion 59 does not receive a remote operation from a remote operation device unless the user operates the remote operation device. If a non-operation state is detected, non-operation detection portion 77 outputs a setting instruction to sequential setting portion 87.

Job number limit portion 80 limits the number of jobs executable through a remote operation by the remote operation device set as an active device. Job number limit portion 80 stores an upper limit value indicating the number of executables jobs and counts the number of jobs executed by process execution portion 55 in accordance with a remote operation by the remote operation device set as an active device. When the number of jobs executed by process execution portion 55 in accordance with a remote operation by the remote operation device set as an active device reaches the upper limit value, job number limit portion 80 prohibits process execution portion 55 executing a process in accordance with a remote operation by the remote operation device set as an active device and outputs a job number-reached signal indicating that the number of jobs executed reaches the upper limit value to job number limit detection portion 81. Job number limit portion 80 calculates the remaining number of jobs executable through a remote operation by the remote operation device set as an active device by subtracting, from the upper limit value, the number of jobs executed by process execution portion 55 in accordance with a remote operation by the remote operation device set as an active device, and outputs the calculated remaining number of jobs to standby device notification portion 61.

Job number limit detection portion 81 outputs a setting instruction to sequential setting portion 87 in response to input of a job number-reached signal from job number limit portion 80.

Setting time count portion 78 counts the time for the remote operation device set as an active device to set the setting value. Setting time count portion 78 counts the time from when a remote operation device is set as an active device or when process execution portion 55 starts execution of a job to when a remote operation of an execution instruction operation is input from the remote operation device set as an active device. When the counted time is a predetermined time or longer, setting time count portion 78 outputs a change instruction to limit value change portion 79. This is because the user who operates the remote operation device may require some time to set a setting value for remotely operating MFP 100 to execute a job.

Limit value change portion 79 changes the upper limit value used by job number limit portion 80 in response to input of a change instruction from setting time count portion 78. Specifically, the upper limit is reduced. This is to prevent a total time for the user who operates the remote operation device to remotely operate MFP 100 to execute a plurality of jobs from becoming longer.

Operation time limit portion 86 limits the time during which the remote operation device set as an active device is set as an active device. Operation time limit portion 86 stores an upper limit value indicating the upper limit of time during which the remote operation device is set as an active device, and counts the time since the remote operation device is set as an active device. If the time since the remote operation device is set as an active device reaches the upper limit value, operation time limit portion 86 prohibits process execution portion 55 executing a process in accordance with a remote operation by the remote operation device set as an active device and outputs a time-reached signal indicating that the operation time has reached the upper limit value to time limit detection portion 83. This is to prevent a total time for the user who operates the remote operation device to remotely operate MFP 100 from becoming longer.

Extension portion 85 prohibits limitation by operation time limit portion 86 until process execution portion 55 executes at least one job through a remote operation received from the remote operation device set as an active device. Extension portion 85 counts the number of jobs executed by process execution portion 55 in accordance with a remote operation by the remote operation device set as an active device. Extension portion 85 outputs a prohibit signal to time limit detection portion 83 until the number of jobs executed by process execution portion 55 in accordance with a remote operation by the remote operation device set as an active device becomes one or more. When the number of jobs executed by process execution portion 55 in accordance with a remote operation by the remote operation device becomes one or more, extension portion 85 stops outputting the prohibit signal.

In response to input of a time-reached signal from operation time limit portion 86, time limit detection portion 83 outputs a setting instruction to sequential setting portion 87 on condition that a prohibit signal is not input from extension portion 85. When a time-reached signal is input from operation time limit portion 86, time limit detection portion 83 outputs a setting instruction to sequential setting portion 87 unless a prohibit signal is input from extension portion 85. When a time-reached signal is input from operation time limit portion 86, if a prohibit signal is input from extension portion 85, time limit detection portion 83 outputs a setting instruction to sequential setting portion 87 in response to input of the prohibit signal from extension portion 85 being stopped.

Sequential setting portion 87 detects an end state in which a remote operation is not received from the remote operation device set as an active device, when a setting instruction is input from any one of path cut-off detection portion 75, non-operation detection portion 77, job number limit detection portion 81, and time limit detection portion 83. When detecting the end state, sequential setting portion 87 resets the setting for the remote operation device set as an active device and sets the remote operation device set as a standby device to be an active device. Sequential setting portion 87 receives a set of the device identification information, the session number, and the priority of each remote operation device set as a standby device from standby device setting portion 57. When detecting the end state, sequential setting portion 87 sets the remote operation device specified by the device identification information with the highest priority to be an active device, based on the set of the device identification information, the session number, and the priority input from standby device setting portion 57. When the remote operation device with the highest priority among the remote operation devices set as standby devices is set as an active device, sequential setting portion 87 outputs an active setting signal including the device identification information of the remote operation device set as an active device to standby device setting portion 57 and outputs a set of the device identification information and the session number of the remote operation device set as an active device, among the remote operation devices set as standby devices, to standby device notification portion 61 and active device notification portion 63.

When a setting instruction is input from any one of non-operation detection portion 77, job number limit detection portion 81, and time limit detection portion 83, sequential setting portion 87 outputs a cut-off result signal including a set of the device identification information and the session number of the remote operation device set as an active device to active device notification portion 63.

Standby device notification portion 61 receives a set of the device identification information and the session number of each remote operation device set as a standby device from standby device setting portion 57 and receives a set of the device identification information and the session number of the remote operation device set as an active device from sequential setting portion 87 in active device setting portion 59. Standby device notification portion 61 includes a priority notification portion 91, an active device information notification portion 92, and a job number notification portion 93.

Priority notification portion 91 receives a set of the device identification information, the session number, and the priority for each remote operation device set as a standby device every time standby device setting portion 57 sets a remote operation device as a standby device or every time the priority associated with the remote operation device set as a standby device is changed. Priority notification portion 91 notifies each remote operation device set as a standby device of the priority. Specifically, in response to input of a set of device identification information, a session number, and a priority from standby device setting portion 57, priority notification portion 91 controls communication I/F unit 112 to transmit the priority input from standby device setting portion 57 through the communication path having the session number input from standby device setting portion 57. At the remote operation device receiving the priority, the number of remote operation devices set as standby devices that is calculated from the priority is displayed to allow the user who operates the remote operation device to know the number of waiting devices and thereby predict the time taken until a remote operation becomes enabled.

Active device information notification portion 92 notifies each remote operation device set as a standby device of the remote operation device set as an active device. Specifically, active device information notification portion 92 selects a set of device identification information and a session number input from standby device setting portion 57 in order and controls communication I/F unit 112 to transmit the device identification information of the remote operation device set as an active device through the communication path having the session number included in the selected set.

Job number notification portion 93 receives the remaining number of executable jobs from job number limit portion 80. Job number notification portion 93 notifies each remote operation device set as a standby device of the remaining number of jobs executable by the remote operation device set as an active device. Specifically, job number notification portion 93 selects a set of device identification information and a session number input from standby device setting portion 57 in order and controls communication I/F unit 112 to transmit the remaining number of jobs input from job number limit portion 80 through the communication path having the session number included in the selected set.

Active device notification portion 63 receives a set of the device identification information and the session number of the remote operation device set as an active device from the sequential setting portion 87 in active device setting portion 59. Active device notification portion 63 includes an activation notification portion 95, a standby device number notification portion 98, and a cut-off notification portion 99. Activation notification portion 95 notifies the remote operation device set as an active device that a remote operation is in an enabled state, in response to input of a set of the device identification information and the session number of the remote operation device set as an active device from sequential setting portion 87. Activation notification portion 95 includes a remote screen display control portion 96 and a sleep reset portion 97. Remote screen display control portion 96 controls communication I/F unit 112 to transmit a remote operation screen to the remote operation device set as an active device through the communication path having the session number input from sequential setting portion 87. Sleep reset portion 97 controls communication I/F unit 112 to transmit a sleep reset command to the remote operation device set as an active device through the communication path having the session number input from sequential setting portion 87. The sleep reset command includes a command to allow the remote operation device to reset a sleep state.

Standby device number notification portion 98 specifies the number of remote operation devices set as standby devices by counting the number of respective sets of device identification information and the session number of the remote operation devices set as standby devices that are input from standby device setting portion 57. Standby device number notification portion 98 controls communication I/F unit 112 to transmit the number of remote operation devices set as standby devices through the communication path having the session number input from sequential setting portion 87.

In response to input a cut-off result signal from sequential setting portion 87 in active device setting portion 59, cut-off notification portion 99 notifies the remote operation device specified by the device identification information included in the cut-off result signal of cut-off information indicating that remote operation is in a disabled state. The cut-off result signal includes a set of the device identification information and the session number of the remote operation device that has been set as an active device. In response to input of a cut-off signal, cut-off notification portion 99 controls communication I/F unit 112 to transmit the cut-off information through the communication path having the session number included in the cut-off result signal and thereafter cuts off the communication path.

The functions of portable information devices 200, 200A, 200B will now be described. Portable information devices 200, 200A, 200B have the same functions, and portable information device 200 will be taken as an example in the description here.

Figure 6:
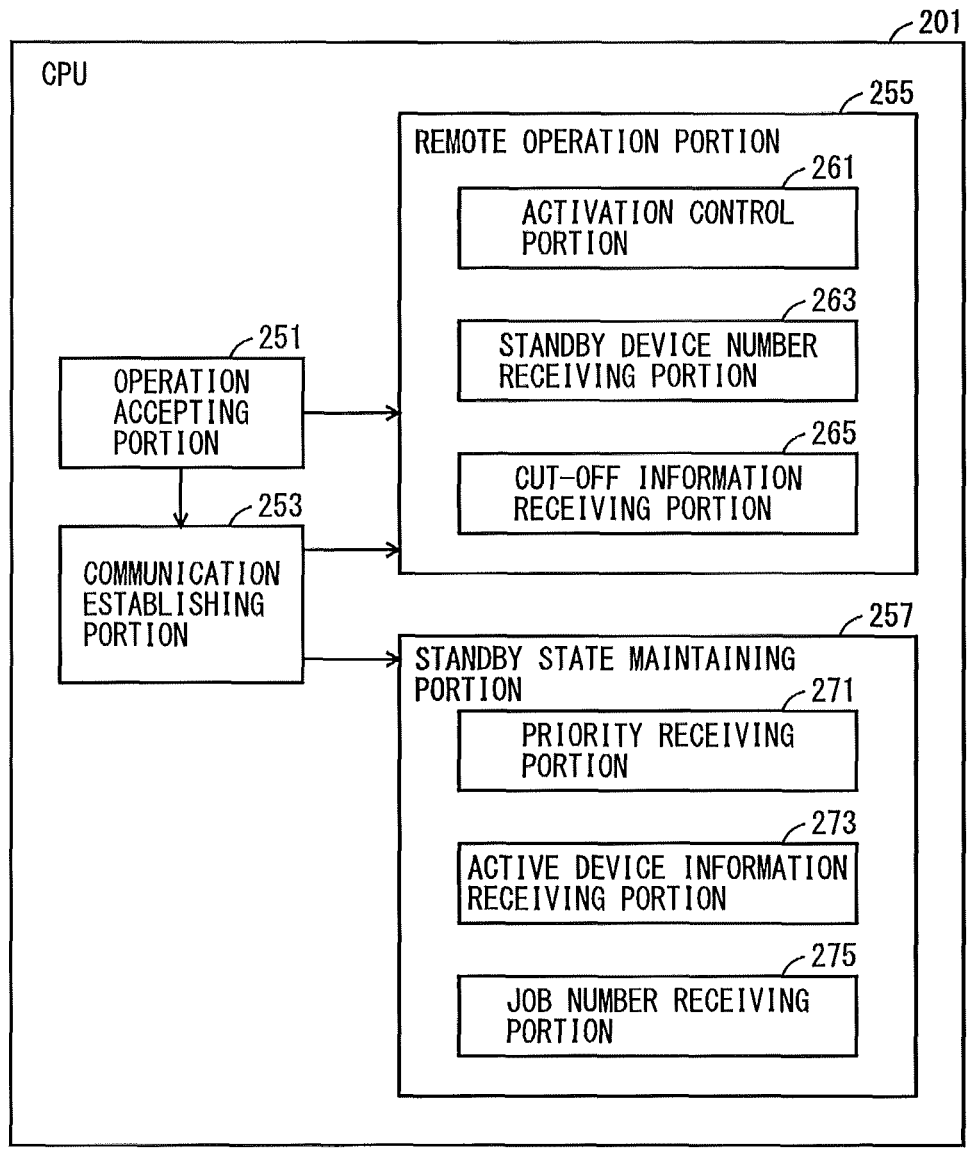
FIG. 6 is a block diagram showing an example of functions of the CPU of the portable information device.

FIG. 6 is a block diagram showing an example of functions of the CPU of the portable information device. The functions shown in FIG. 6 are the functions formed in CPU 201 by CPU 201 of portable information device 200 executing a remote operation program stored in flash memory 203 or CD-ROM 211A. Referring to FIG. 6, CPU 201 includes an operation accepting portion 251 accepting an operation by the user, a communication establishing portion 253 establishing a communication path with MFP 100, a remote operation portion 255 remotely controlling MFP 100, and a standby state maintaining portion 257.

Operation accepting portion 251 accepts an operation input by the user to operation unit 207. Operation accepting portion 251 outputs the accepted operation to communication establishing portion 253 and remote operation portion 255.

Communication establishing portion 253 establishes a communication path with MFP 100 if the operation input from operation accepting portion 251 indicates start of a remote operation. Specifically, communication establishing portion 253 stores the network address (IP address) of MFP 100 in flash memory 203 in advance. Communication establishing portion 253 controls wireless LAN I/F 208 to transmit a connection request to MFP 100 and negotiates with MFP 100 thereby establishing a communication path. Communication establishing portion 253 outputs a session number for identifying the communication path established with MFP 100 to remote operation portion 255 and standby state maintaining portion 257.

When the operation input from operation accepting portion 251 indicates a remote operation, remote operation portion 255 transmits the remote operation to MFP 100 through the communication path specified by the session number input from communication establishing portion 253. When wireless LAN I/F 208 receives a packet including the session number input from communication establishing portion 253, remote operation portion 255 specifies the information received from MFP 100 based on the received packet. When a remote operation screen is received from MFP 100, remote operation portion 255 displays the received remote operation screen on display unit 206. Remote operation portion 255 includes an activation control portion 261, a standby device number receiving portion 263, and a cut-off information receiving portion 265.

When a sleep reset command is received from MFP 100, if the operation mode is set in a sleep state, activation control portion 261 switches the operation mode to a normal state in which power consumption is higher than the sleep state, and allows the speaker to produce beep sound. When a remote operation screen is received from MFP 100, activation control portion 261 displays the received remote operation screen on display unit 206, in place of the screen that has appeared on display unit 206. The user who operates portable information device 200 is thereby notified that the user becomes able to remotely operate MFP 100. The beep sound produced from the speaker notifies the user of portable information device 200 that the user becomes able to remotely operate MFP 100 even when the user is not operating portable information device 200.

Standby device number receiving portion 263 receives the number of standby devices from MFP 100 and then displays the received number of standby devices on display unit 206. The user who operates portable information device 200 is thereby notified of the number of users who are waiting to remotely operate MFP 100.

Cut-off information receiving portion 265 receives cut-off information from MFP 100 and then displays a message on display unit 206 to indicate that MFP 100 has been switched to a remote operation-disabled state. The user who operates portable information device 200 is thereby notified that MFP 100 has been switched to a remote operation-disabled state.

Standby state maintaining portion 257 receives a session number from communication establishing portion 253 and, if wireless LAN I/F 208 receives a packet including the session number input from communication establishing portion 253, specifies the information received from MFP 100 based on the received packet. Standby state maintaining portion 257 includes a priority receiving portion 271, an active device information receiving portion 273, and a job number receiving portion 275.

When a priority is received from MFP 100, priority receiving portion 271 decides the number of standby devices based on the received priority and displays the number of standby devices on display unit 206. The user who operates portable information device 200 is thereby notified of the order for remotely operating MFP 100.

When the device identification information of the remote operation device set as an active device is received from MFP 100, active device information receiving portion 273 displays the received device identification information on display unit 206 to indicate the active device. The user who operates portable information device 200 is thereby notified of the remote operation device operated by the user who is remotely operating MFP 100. The device identification information is associated with the user identification information of the user who operates the remote operation device specified by that device identification information, so that the user who operates portable information device 200 is notified of the user who is remotely operating MFP 100.

When the remaining number of jobs executable by the remote operation device set as an active device is received from MFP 100, job number receiving portion 275 displays the received remaining number on display unit 206. The user who operates portable information device 200 is thereby notified of the remaining number of jobs executable by the user who is remotely operating MFP 100.

Figure 7:
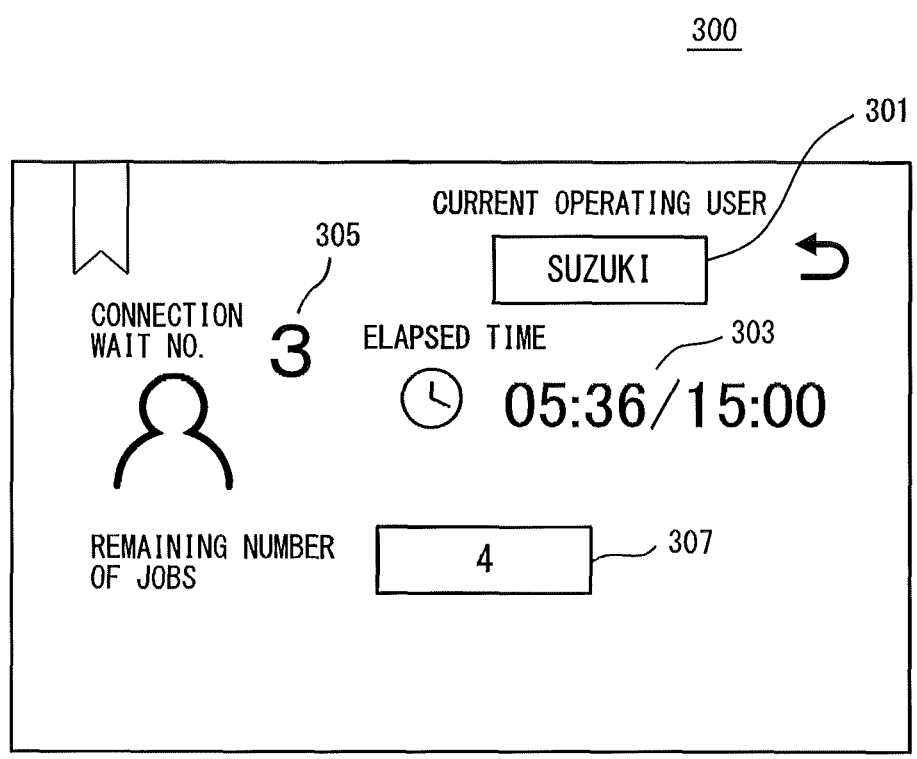
FIG. 7 is a diagram showing an example of a standby screen.

FIG. 7 is a diagram showing an example of a standby screen. Referring to FIG. 7, standby screen 300 is a screen appearing on the remote operation device set as a standby device. Standby screen 300 includes an area 301 for displaying the name of the user who is remotely operating MFP 100, an area 303 for displaying an elapsed time, an area 305 for displaying a priority, and an area 307 for displaying the remaining number of jobs. In area 301, the name of the user who uses the remote operation device set as an active device is displayed. The user who uses the remote operation device set as an active device is the user who is remotely operating MFP 100.

In area 303, the elapsed time since a communication path with MFP 100 is established is displayed. In area 305, a priority is displayed. The priority indicates the number of standby devices including the remote operation device itself. In area 307, the remaining number of jobs executable through a remote operation by the remote operation device set as an active device is displayed.

Figure 8:
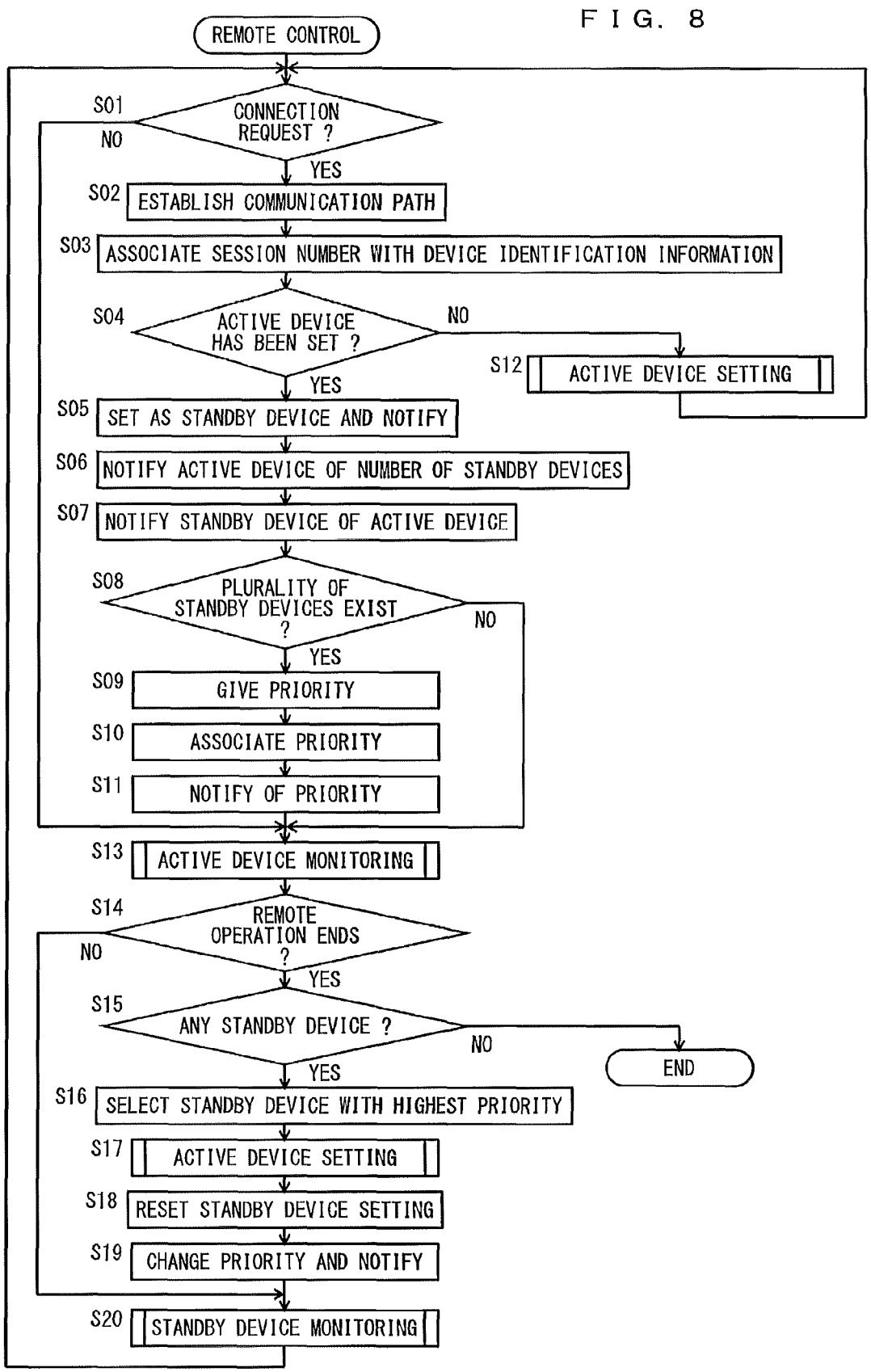
FIG. 8 is a flowchart showing an example of the procedure of a remote control process.

FIG. 8 is a flowchart showing an example of the procedure of a remote control process. The remote control process is a process executed by CPU 111 of MFP 100 executing a remote control program stored in ROM 113, HDD 115, or CD-ROM 118.

Referring to FIG. 8, CPU 111 determines whether a connection request has been received (step S01). It is determined whether communication I/F unit 112 has received a connection request from an external remote operation device. If a connection request has been received (YES in step S01), the process proceeds to step S02. If not, the process proceeds to step S13.

In step S02, a communication path is established with the remote operation device that has transmitted the connection request. Specifically, a communication path is established by sharing the same session number with the remote operation device. The communication path is identified by a session number, and a packet including the same session number is transmitted/received to/from the remote operation device. In the next step S03, the session number is associated with the device identification information for identifying the remote operation device. A set of the session number and the device identification information is stored into RAM 114.

In the next step S04, it is determined whether an active device has been set. If an active device has already been set, the process proceeds to step S05. If not, the process proceeds to step S12. In step S12, an active device setting process is performed, and the process proceeds to step S12. The active device setting process, which will be detailed later, is a process of setting the remote operation device that has transmitted the connection request received in step S01 to be an active device.

In step S05, the remote operation device that has transmitted the connection request received in step S01 is set as a standby device, and the remote operation device is notified that it has been set as a standby device. The process proceeds to step S06. Specifically, a set of the device identification information and the session number of the remote operation device set as a standby device is stored into RAM 114, and communication I/F unit 112 is controlled so that a signal indicating that the remote operation device has been set as a standby device is transmitted through the communication path specified by the session number. In step S06, the active device is notified of the number of standby devices. Since sets of the device identification information and the session number of the remote operation devices set as standby devices are stored in RAM 114, the number of standby devices is decided by counting the device identification information set as standby devices. The active device is set in step S12 or in step S17 described later, and a set of the device identification information and the session number of the remote operation device set as an active device is stored in RAM 114. Communication I/F unit 112 is controlled so that the number of remote operation devices set as standby devices is transmitted through the communication path specified by the session number associated with the active device. The remote operation device set as an active device thus receives the number of standby devices, so that the user who operates the remote operation device set as an active device is notified of the number of users who wish to use MFP 100. The user who operates the remote operation device set as an active device is thereby prompted to reduce the remote operation time for MFP 100.

In the next step S07, the standby device is notified of the active device, and the process proceeds to step S08. A set of the device identification information and the session number of the remote operation device set as a standby device and a set of the device identification information and the session number of the remote operation device set as an active device are stored in RAM 114. Communication I/F unit 112 is controlled so that the device identification information of the remote operation device set as an active device is transmitted through the communication path specified by the session number associated with the standby device. If a plurality of sets of the device identification information and the session number of the remote operation devices set as standby devices are stored in RAM 114, the device identification information of the remote operation device set as an active device is transmitted to all of the standby devices.

In step S08, it is determined whether the number of remote operation devices set as standby devices is more than one. If a plurality of sets of the device identification information and the session number of the remote operation devices set as standby devices are stored into RAM 114, the process proceeds to step S09. If not, the process proceeds to step S13. In step S09, priorities are given to a plurality of remote operation devices set as standby devices. The lowest priority is given to the remote operation device that has transmitted the connection request received in step S01. When the set of the device identification information and the session number of the remote operation device that has transmitted connection request received in step S01 is stored into RAM 114 in step S05, the sets of the device identification information and the session number of one or more remote operation devices set as standby devices have already been stored in RAM 114, and the one or more remote operation devices are associated with priorities. In step S10, the priority given in step S09 to the remote operation device that has transmitted the connection request received in step S01 is associated, and the process proceeds to step S11. Specifically, since a set of the device identification information and the session number of the remote operation device that has transmitted the connection request received in step S01 is stored in RAM 114, the priority is associated with the set and stored in RAM 114.

In the next step S11, the remote operation device that has transmitted the connection request received in step S01 is notified of the priority. The priority is transmitted through the communication path established in step S02. The priority is thus transmitted to the remote operation device that has transmitted the connection request received in step S01. At the remote operation device receiving the priority, the number of standby devices is displayed based on the priority, thereby notifying the user who operates the remote operation device of the number of standby devices, in other words, the order in the queue.

In step S13, an active device monitoring process is performed, and the process proceeds to step S14. The active device monitoring process, which will be detailed later, is a process of executing a process in accordance with a remote operation by the remote operation device set as an active device. The active device monitoring process includes a process of terminating the remote operation by the remote operation device set as an active device. In the next step S14, it is determined whether the remote operation by the remote operation device set as an active device has been finished, as a result of the active device monitoring process executed in step S13. If the remote operation has been finished, the process proceeds to step S15. If not, the process proceeds to step S20.

In step S15, it is determined whether there exists a standby device. If a set of the device identification information and the session number of the remote operation device set as a standby device is stored in RAM 114, the process proceeds to step S16. If not, the process ends. In step S16, the standby device with the highest priority is selected. At the time when step S16 is performed, the priorities associated with the sets of the device identification information and the session number of the remote operation devices set as standby devices are stored in RAM 114. The set associated with the highest priority is selected from the sets of the device identification information and the session number of the standby devices that are stored in RAM 114, and the remote operation device specified by the device identification information included in the selected set is selected.

In the next step S17, the active device setting process is performed in the same manner as in step S12. The process proceeds to step S18. The execution of the active device setting process allows the remote operation device selected in step S16 to be set as an active device. In step S18, the setting of the remote operation device selected in step S15 as a standby device is reset. In step S19, the priority is changed, and the standby device is notified of the changed priority. The process proceeds to step S20. Specifically, the priority associated with the set of the device identification information and the session number of the remote operation device set as a standby device is stored in RAM 114, and that priority is changed. In addition, a standby device is specified based on the set of the device identification information and the session number of the remote operation device set as a standby device that is stored in RAM 114, and the priority corresponding to the specified standby device is transmitted through the communication path specified by the session number corresponding to the specified standby device. At the remote operation device receiving the changed priority, the number of standby devices is displayed based on the changed priority, thereby notifying the user who operates the remote operation device of the changed number of standby devices, in other words, the changed order in the queue.

In step S20, a standby device monitoring process is performed, and the process returns to step S01. The standby device monitoring process, which will be detailed later, is a process of changing the priorities given to standby devices.

Figure 9:
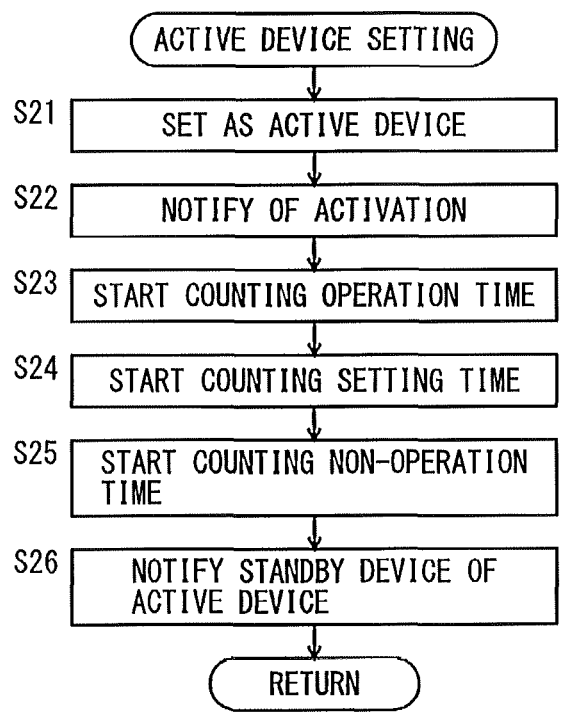
FIG. 9 is a flowchart showing an example of the procedure of an active device setting process.

FIG. 9 is a flowchart showing an example of the procedure of the active device setting process. The active device setting process is a process performed in step S12 and step S17 in the remote control process shown in FIG. 8. Before the active device setting process is performed, the remote operation device to be processed has been determined. Specifically, before step S12 in FIG. 8 is performed, the remote operation device that has transmitted the connection request received in step S01 has been determined as a process target. Before step S17 in FIG. 8 is performed, the remote operation device selected in step S16 has been determined as a process target.

Referring to FIG. 9, in step S21, the remote operation device that has been determined as a process target is set as an active device. In the next step S22, the remote operation device set as an active device is notified that it has been activated as an active device. Specifically, communication I/F unit 112 is controlled so that a sleep reset command and a remote operation screen are transmitted to the remote operation device set as an active device through the communication path specified by the session number of the remote operation device set as an active device. The sleep reset command includes a command to allow the remote operation device to reset the sleep state. The remote operation device set as an active device receives the sleep reset command and resets the sleep state, if it is in the sleep state, and displays the remote operation screen. The user who operates the remote operation device set as an active device is thereby notified that the user can remotely operate MFP 100.

In step S23, the counting of the operation time is started. The operation time is a time elapsed since the remote operation device is set as an active device. In step S24, the counting of the setting time is started. The setting time is a time for setting a setting value for executing a job through a remote operation by the remote operation device set as an active device. In step S25, the counting of the non-operation time is started. The non-operation time is a time during which a remote operation by the remote operation device set as an active device is not accepted. In the next step S26, the standby device is notified of the active device, and the process returns to the remote control process. A set of the device identification information and the session number of the remote operation device set as a standby device and a set of the device identification information and the session number of the remote operation device set as an active device in step S21 are stored in RAM 114. Communication I/F unit 112 is controlled so that the device identification information of the remote operation device set as an active device in step S21 is transmitted through the communication path specified by the session number associated with the standby device. When a plurality of sets of the device identification information and the session number of the remote operation devices set as standby devices are stored in RAM 114, the device identification information of the remote operation device set as an active device in step S21 is transmitted to all of the standby devices.

Figure 10:
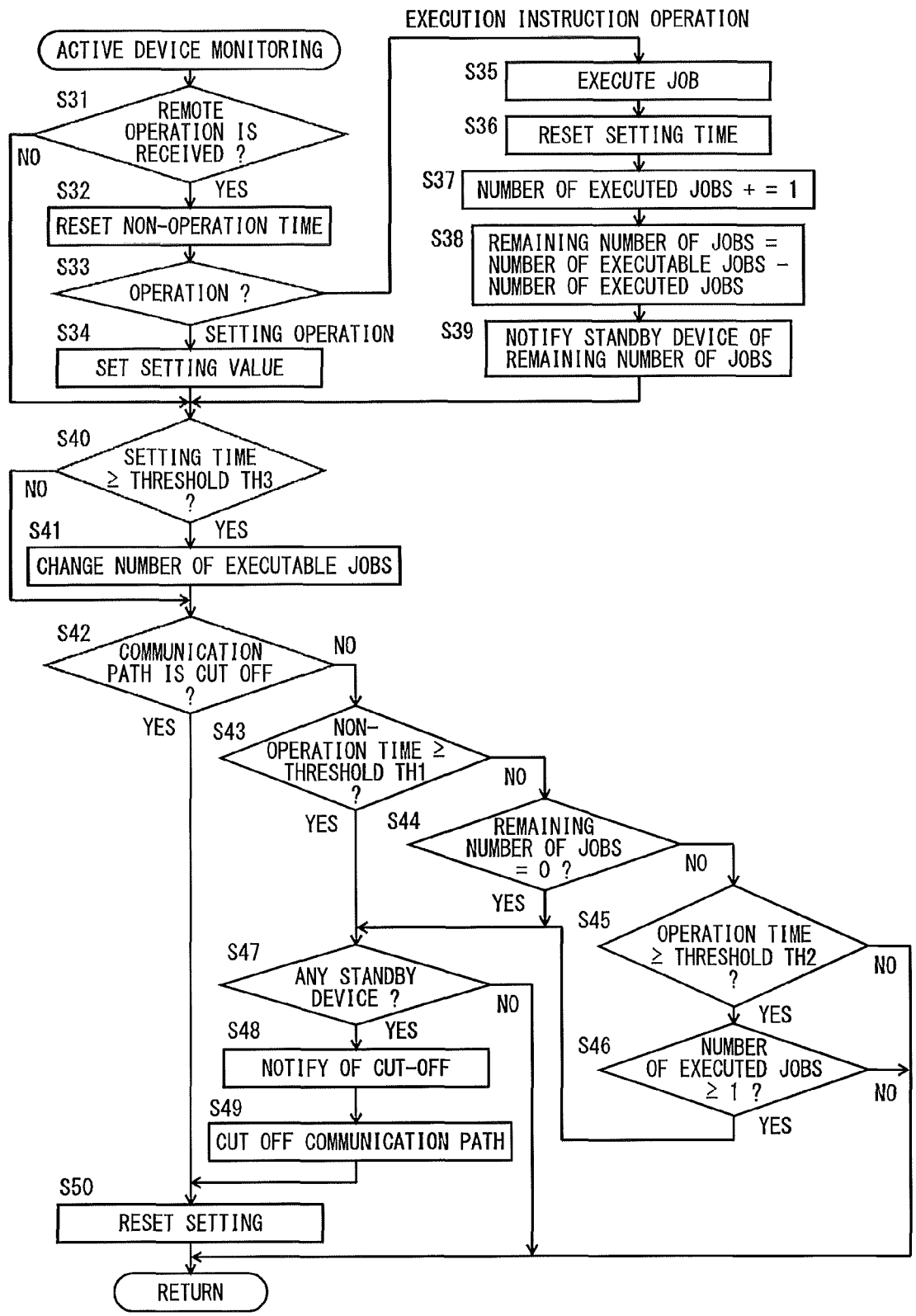
FIG. 10 is a flowchart showing an example of the procedure of an active device monitoring process.

FIG. 10 is a flowchart showing an example of the procedure of the active device monitoring process. The active device monitoring process is a process performed in step S13 in the remote control process shown in FIG. 7. Referring to FIG. 10, CPU 111 determines whether a remote operation has been received from the remote operation device set as an active device (step S31). If communication I/F unit 112 has received a remote operation through the communication path specified by the session number of the remote operation device set as an active device, it is determined that a remote operation has been received from the remote operation device set as an active device. If a remote operation has been received, the process proceeds to step S32. If not, the process proceeds to step S40.

In step S32, the non-operation time is rest. The non-operation time is set to "0" and the counting of the non-operation time is started. In the next step S33, the process branches depending on the remote operation. If the remote operation is a setting operation for setting a setting value, the process proceeds to step S34. If the remote operation is an execution instruction operation for giving an instruction to execute a job, the process proceeds to step S35. In step S34, a setting value is set in accordance with the setting operation. The process then proceeds to step S40.

In step S35, the job specified by the execution instruction is executed, and the process proceeds to step S36. In step S36, the setting time is reset. Specifically, the setting time counted so far is reset to "0", and the counting of the setting time is started. In the next step S37, the number of executed jobs is incremented. The number of executed jobs is the number of times a job is executed in accordance with a remote operation by the remote operation device set as an active device. In the next step S38, the remaining number of jobs is calculated. The remaining number of jobs is calculated by subtracting the number of executed jobs from the number of executable jobs. The number of executable jobs is the number of jobs that can be executed in accordance with a remote operation by the remote operation device set as an active device. The initial value thereof is preset and is changed in step S41 described later.

In step S39, the standby device is notified of the remaining number of jobs, and the process proceeds to step S40. A set of the device identification information and the session number of the remote operation device set as a standby device and a set of the device identification information and the session number of the remote operation device set as an active device are stored in RAM 114. Communication I/F unit 112 is controlled so that the remaining number of jobs calculated in step S38 is transmitted through the communication path specified by the session number associated with the standby device. When a plurality of sets of the device identification information and the session number of the remote operation devices set as standby devices are stored in RAM 114, the remaining number of jobs is transmitted to all of the standby devices. The user of the remote operation device set as a standby device is thereby notified of the remaining number of jobs and can predict the wait time.

In step S40, it is determined whether the setting time is equal to or greater than a threshold value TH3. If the setting time is equal to or greater than threshold value TH3, the process proceeds to step S41. If not, the process skips step S41 and proceeds to step S42. In step S41, the number of executable jobs is changed. When the setting time is equal to or greater than threshold value TH3 and the operation of setting a setting value takes a long time, the number of executable jobs is reduced, thereby preventing the total time taken to be remotely operated by the remote operation device set as an active device from becoming longer.

In step S42, it is determined whether the communication path has been cut off. If the communication path has been cut off, the process proceeds to step S50. If not, the process proceeds to step S43. The communication path here is the communication path specified by the session number of the remote operation device set as an active device. The conditions in which the communication path is cut off include a case where the remote operation device set as an active device cuts off the communication path and a case where a communication error such as noise increase occurs continuously for a predetermined time or longer in the communication by communication I/F unit 112. The case where the remote operation device set as an active device cuts off the communication path includes a case where the user who operates the remote operation device inputs an operation of terminating the remote operation to the remote operation device.

In step S43, it is determined whether the non-operation time is equal to or greater than a threshold value TH1. If the non-operation time is equal to or greater than threshold value TH1, the process proceeds to step S47. If not, the process proceeds to step S44. In step S44, it is determined whether the remaining number of jobs is equal to "0". If the remaining number of jobs is equal to "0", the process proceeds to step S47. If not, the process proceeds to step S45. In step S45, it is determined whether the operation time is equal to or greater than a threshold value TH2. If the operation time is equal to or greater than threshold value TH2, the process proceeds to step S46. If not, the process returns to the remote control process. In step S46, it is determined whether the number of executed jobs is equal to or greater than 1. If the number of executed job is equal to or greater than 1, the process proceeds to step S47. If not, the process returns to the remote control process.

In step S47, it is determined whether there exists a standby device. If a standby device exists, the process proceeds to step S48. If not, the process returns to the remote control process. In step S48, the active device is notified of the cut-off, and the process proceeds to step S49. Communication I/F unit 112 is controlled so that cut-off information indicating that remote operation is in a disabled state is transmitted through the communication path specified by the session number associated with the remote operation device set as an active device. At the remote operation device receiving the cut-off information, an end message is displayed to indicate that remote operation is in a disabled state, thereby notifying the user that the communication path is to be cut off and the remote operation becomes unable to continue.

In step S49, the communication path of the active device is cut off, and the process proceeds to step S50. A cut-off signal indicating that the communication path is to be cut off is transmitted through the communication path specified by the session number associated with the remote operation device set as an active device.

In step S50, the setting as an active device is reset, and the process returns to the remote control process. Specifically, a set of the device identification information and the session number of the remote operation device set as an active device is erased from RAM 114.

Steps S47 to S49 are performed if a standby device exists in step S47, and if no standby device exists, the remote operation device set as an active device can continue a remote operation on MFP 100 even when the non-operation time is equal to or greater than threshold value TH1, when the number of executed jobs exceeds the number of executable jobs, or when the operation time is equal to or greater than threshold value TH2 and one or more jobs have been executed. This is because no standby device exists and there is no need for limiting a period of time set for the active device.

Although step S48 and step S49 are performed if a standby device exists in step S47, step S48 and step S49 may be performed if a predetermined number of standby devices, for example, two or more exist.

Figure 11:
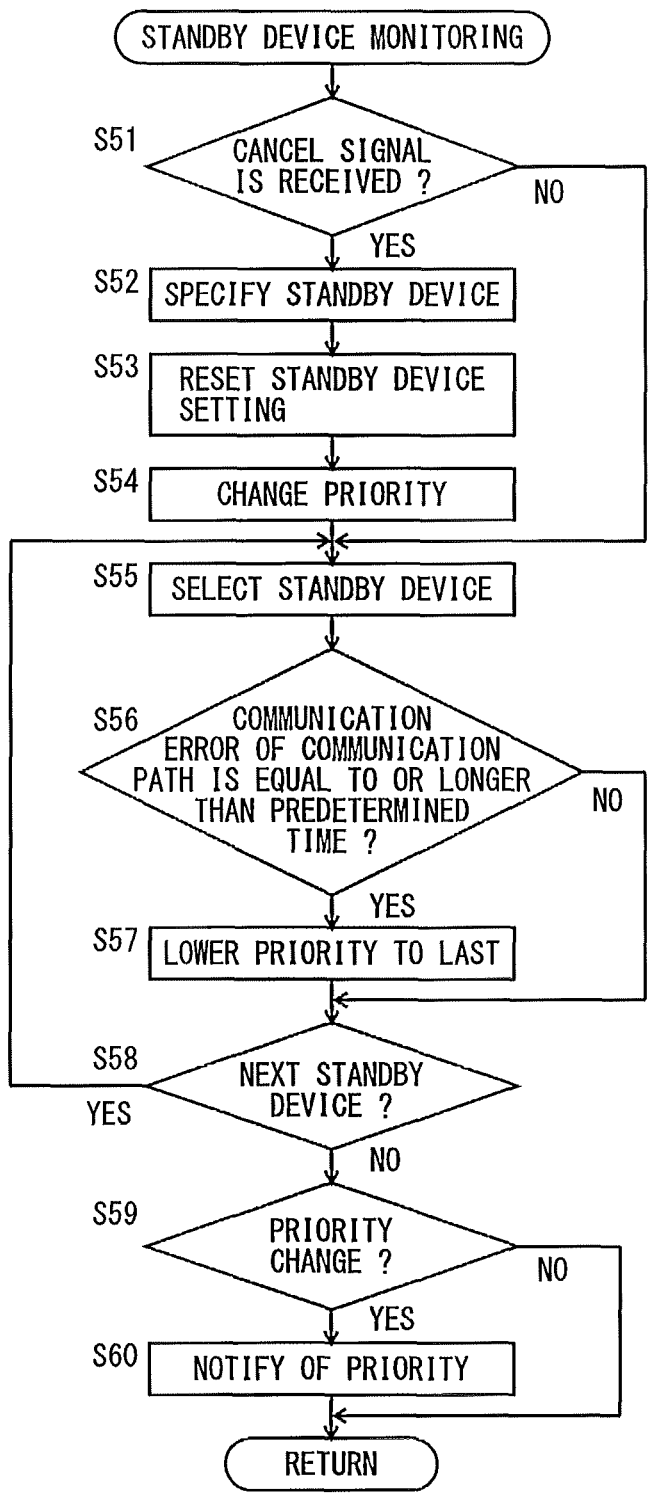
FIG. 11 is a flowchart showing an example of the procedure of a standby device monitoring process.

FIG. 11 is a flowchart showing an example of the procedure of the standby device monitoring process. The standby device monitoring process is a process performed in step S20 in the remote control process shown in FIG. 8. Referring to FIG. 11, CPU 111 determines whether a cancel signal has been received (step S51). If communication I/F unit 112 has received a cancel signal, the process proceeds to step S52. If not, the process proceeds to step S57. In step S52, the standby device that has transmitted the cancel signal is specified. A set of the device identification information and the session number of the remote operation device set as a standby device is stored in RAM 114. The remote operation device specified by the device identification information that makes a set with the session number of the communication path through which the cancel signal has been received is specified.

In step S53, the setting as a standby device for the specified remote operation device is reset. Specifically, a cut-off signal indicating the communication path is to be cut off is transmitted through the communication path specified by the session number associated with the specified remote operation device, and a set of the device identification information and the session number of the specified remote operation device is erased from RAM 114.

In the next step S54, the priorities are changed. The priorities associated with the sets of the device identification information and the session number of the remote operation devices set as standby devices that are stored in RAM 114 are changed in a sequential order.

In the next step S55, a standby device to be processed is selected. One of the sets of the device identification information and the session number of the remote operation devices set as standby devices that are stored in RAM 114 is selected. In the next step S56, it is determined whether a communication error continues for a predetermined time or longer in the communication path specified by the session number included in the selected set. If a communication error continues for a predetermined time or longer, the process proceeds to step S57. If not, the process proceeds to step S58. In step S57, the priority associated with the remote operation device selected as a process target is lowered to the lowest priority. The process proceeds to step S58.

In step S58, it is determined whether there exists a standby device not yet selected as a process target. If there exists a standby device not yet selected as a process target, the process returns to step S55. If not, the process proceeds to step S59.

In step S59, it is determined whether the priorities have been changed. If the priorities have been changed in step S54 or step S57, the process proceeds to step S60. If not, the process skips step S60 and returns to the remote control process. In step S60, the standby device is notified of the changed priority, and the process returns to the remote control process. Specifically, the standby device is specified based on a set of the device identification information and the session number of the remote operation device set as a standby device that is stored in RAM 114, and the priority corresponding to the specified standby device is transmitted through the communication path specified by the session number corresponding to the specified standby device. At the remote operation device receiving the changed priority, the number of standby devices is displayed based on the changed priority, thereby notifying the user who operates the remote operation device of the changed number of standby devices, in other words, the changed order in the queue.

Figure 12:
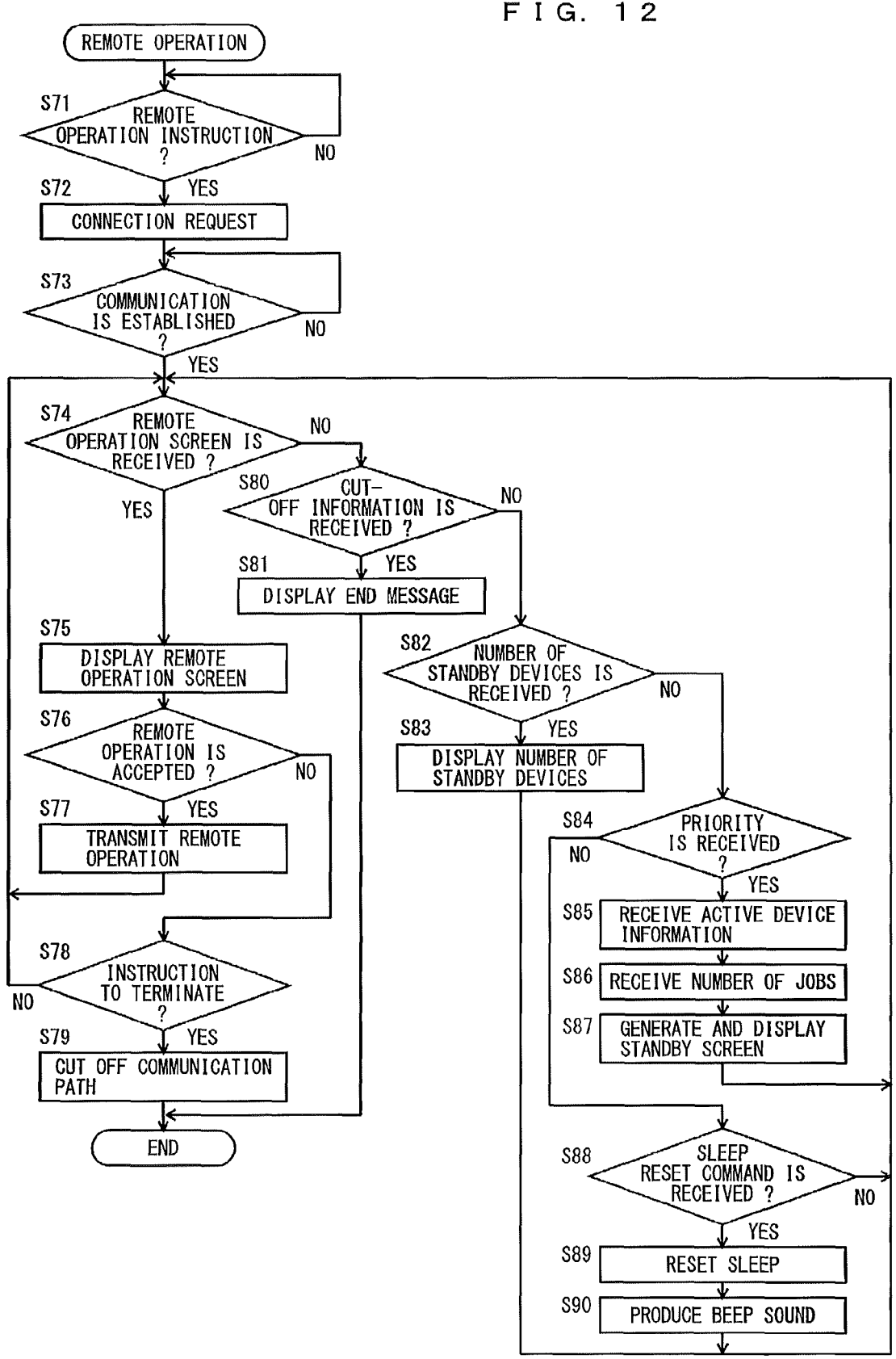
FIG. 12 is a flowchart showing an example of the procedure of a remote operation process.

FIG. 12 is a flowchart showing an example of the procedure of a remote operation process. The remote operation process is a process performed by CPU 201 of portable information device 200 executing a remote operation program stored in flash memory 203 or CD-ROM 211A. Referring to FIG. 12, it is determined whether a remote operation instruction has been received (step S71). The user inputs a remote operation instruction to operation unit 207, and operation unit 207 accepts the remote operation instruction. The process waits until a remote operation instruction is accepted (NO in step S71). If a remote operation instruction has been accepted (YES in step S71), the process proceeds to step S72.

In step S72, wireless LAN I/F 208 is controlled so that a connection request is transmitted to MFP 100. In the next step S73, it is determined whether a communication path has been established with MFP 100. The process waits until a communication path is established (NO in step S73). If a communication path has been established (YES in step S73), the process proceeds to step S74. In step S74, it is determined whether a remote operation screen has been received from MFP 100. If a remote operation screen has been received, the process proceeds to step S75. If not, the process proceeds to step S80. In step S75, the received remote operation screen appears on display unit 206, and the process proceeds to step S76.

In step S76, it is determined whether a remote operation has been accepted. The operation input by the user to operation unit 207 is accepted as a remote operation. If a remote operation has been accepted, the process proceeds to step S77. If not, the process proceeds to step S78. In step S77, the accepted remote operation is transmitted to MFP 100, and the process returns to step S74. In step S78, it is determined whether an instruction to terminate the remote operation has been accepted. If a predetermined key in operation unit 207 is pressed, an instruction to terminate the remote operation is accepted. If an instruction to terminate the remote operation has been accepted, the process proceeds to step S79. If not, the process returns to step S74. In step S79, the communication path established with MFP 100 in step S73 is cut off. The process then ends.

In step S80, it is determined whether cut-off information has been received from MFP 100. If cut-off information has been received, the process proceeds to step S81. If not, the process proceeds to step S82. In step S81, an end message appears on display unit 206 to indicate that remote operation is in a disabled state. The process then ends.

In step S82, it is determined whether the number of standby devices has been received from MFP 100. If the number of standby devices has been received, the process proceeds to step S83. If not, the process proceeds to step S84. In step S83, the received number of standby devices appears on display unit 206, and the process returns to step S74.

In step S84, it is determined whether the priority has been received from MFP 100. If the priority has been received, the process proceeds to step S85. If not, the process proceeds to step S88. The priority is received from MFP 100 if MFP 100 sets portable information device 200 as a standby device rather than as an active device. In this case, the active device information is received from MFP 100 (step S85), and the number of jobs is received from MFP 100 (step S86). In the next step S87, a standby screen is generated, and the generated screen appears on display unit 206. The process returns to step S74. For example, the standby screen shown in FIG. 7 appears on display unit 206.

In step S88, it is determined whether a sleep reset command has been received. The user sometimes leaves portable information device 200 without operating it after the standby screen appears in step S87. In this case, portable information device 200 switches the operation mode to the sleep state. If a sleep reset command has been received, the process proceeds to step S89. If not, the process returns to step S74. In step S89, the operation mode of the sleep state is reset and switched to the normal state. In the next step S90, beep sound is produced from the speaker, and the process returns to step S74. MFP 100 transmits a remote operation screen after transmitting the sleep reset command, and the remote operation screen transmitted by MFP 100 is received in the next step S74 and displayed on display unit 206 (step S75).

An example will be described below in which portable information devices 200, 200A, 200B as remote operation devices each transmit a connection request to MFP 100 in the order of portable information device 200, portable information device 200A, and portable information device 200B. If a connection request is received from portable information device 200, MFP 100 establishes a communication path with portable information device 200 and sets portable information device 200 as an active device. Portable information devices 200A, 200B set as standby devices therefore do not have to retransmit a connection request, thereby facilitating the operation in a case where a plurality of users perform remote operation. When portable information device 200 is set as an active device, MFP 100 gives an activation notice to portable information device 200. Specifically, a remote operation screen is transmitted to portable information device 200 set as an active device through the established communication path, so that portable information device 200 displays the remote operation screen. The user who operates portable information device 200 thus can know that remote operation becomes enabled.

Subsequently, MFP 100 executes a process in accordance with a remote operation received through the communication path established with portable information device 200 set as an active device. The user who operates portable information device 200 is then allowed to remotely operate MFP 100 through portable information device 200.

If a connection request is received from portable information device 200A while portable information device 200 is being set as an active device, MFP 100 establishes a communication path with portable information device 200A, sets portable information device 200A as a standby device, and transmits a signal to portable information device 200A to indicate that it has been set as a standby device. For example, portable information device 200A is notified of the device identification information for identifying portable information device 200 set as an active device. Portable information device 200A receiving the signal indicating that it has been set as a standby device displays a message indicating that it has been set as a standby device, so that the user who operates portable information device 200A can know that the user cannot remotely operate MFP 100 immediately.

MFP 100 transmits the device identification information of portable information device 200 set as an active device to portable information device 200A set as a standby device. Portable information device 200A displays the device identification information of portable information device 200, so that the user who operates portable information device 200A can know that the user who operates portable information device 200 is remotely operating MFP 100.

In response to portable information device 200A being set as a standby device, MFP 100 notifies portable information device 200 set as an active device of the number of portable information devices set as standby devices. The user who operates portable information device 200 set as an active device thus can know the number of users waiting for remote operation. For example, the user who operates portable information device 200 may minimize the time taken to remotely operate MFP 100 by knowing the number of users waiting for remote operation. In this case, the user who operates portable information device 200A waiting for remote operation soon becomes able to remotely operate MFP 100.

If a connection request is additionally received from portable information device 200B while portable information device 200 is being set as an active device and portable information device 200A is being set as a standby device, MFP 100 establishes a communication path with portable information device 200B, sets portable information device 200B as a standby device, and transmits a signal to portable information device 200B to indicate that it has been set as a standby device. Portable information device 200B receiving the signal indicating that it has been set as a standby device displays a message indicating that it has been set as a standby device, so that the user who operates portable information device 200B can know that the user cannot remotely operate MFP 100 immediately.

In response to portable information device 200B being set as a standby device, MFP 100 notifies portable information device 200 set as an active device of the number of portable information devices set as standby devices. The user who operates portable information device 200 set as an active device thus can know the number of users waiting for remote operation.

MFP 100 transmits the device identification information of portable information device 200 set as an active device to portable information device 200B. Portable information device 200B displays the device identification information of portable information device 200, so that the user who operates portable information device 200B can know that the user who operates portable information device 200 is remotely operating MFP 100.

MFP 100 sets two portable information devices 200A and 200B as standby devices and associates a priority with each of portable information devices 200A and 200B. The earlier is the time when a connection request is received, the higher is the priority. Here, portable information device 200A that has transmitted a connection request earlier is given a priority higher than portable information device 200B. Of portable information devices 200A and 200B set as standby devices, portable information device 200A with the higher priority is set as an active device before portable information device 200B. Therefore, the user who operates portable information device 200A and the user who operates portable information device 200B are fairly given the opportunity of remote operation.

The communication path established with portable information device 200A set as a standby device is maintained until portable information device 200A is set as an active device, and the communication path established with portable information device 200B set as a standby device is maintained until portable information device 200B is set as an active device. Portable information devices 200A and 200B therefore do not have to reestablish a communication path.

If a communication error state in which communication is disabled continues for a predetermined time or longer in the communication path established with portable information device 200A, the priority associated with portable information device 200A is changed to the lowest priority. Here, the priority associated with portable information device 200A is set lower than the priority associated with portable information device 200B. Since the priority associated with portable information device 200A corresponding to the communication path in which a communication error continues for a predetermined time is changed to the lowest priority, the opportunity to remotely operate is given in favor of the user who operates portable information device 200B capable of communication rather than portable information device 200A incapable of communication.

If a communication error state that continues for a predetermined time or longer is eliminated to enable communication in the communication path established with portable information device 200A, the communication path is maintained. For example, a communication error occurs when portable information device 200A is located out of the distance over which communication I/F unit 112 can communicate, for example, when moving at a distance from MFP 100. In the state in which a communication error occurs, MFP 100 cannot be remotely operated from portable information device 200A. The priority is therefore changed in order to provide a period of time for recovery from the communication error.

If MFP 100 receives a cancel instruction from any one of portable information devices 200A, 200B set as standby devices, the setting as a standby device for the device that has transmitted the cancel instruction is reset, and the priorities are changed. For example, when a cancel instruction is received from portable information device 200A, the setting as a standby device for portable information device 200A is reset, and the priority of portable information device 200B is changed to the highest value. Therefore, the opportunity of remote operation is given as early as possible to the user who operates portable information device 200B with the lower priority than the user who operates portable information device 200A and no longer wishes remote operation.

In response to detection of an end state in which no remote operation is received from portable information device 200 set as an active device, MFP 100 sets portable information device 200A with the highest priority to be an active device, of portable information devices 200A and 200B set as standby devices, and gives an activation notice to portable information device 200A. Specifically, MFP 100 transmits a sleep reset command and a remote operation screen to portable information device 200A set as an active device through the established communication path. MFP 100 thereafter executes a process in accordance with a remote operation received through the communication path established with portable information device 200A set as an active device. Portable information device 200A thereby resets the sleep state, if it is in the sleep state, and displays the remote operation screen. The user who operates portable information device 200A thus can know that the user becomes able to remotely operate MFP 100 through portable information device 200A.

MFP 100 detects, as an end state, a state in which the communication path established with portable information device 200 set as an active device is cut off. It is determined that the communication path has been cut off, for example, when the user of portable information device 200 inputs an instruction to terminate the remote operation to portable information device 200 and portable information device 200 cuts off the communication path, or when a communication error such as noise increase continues for a predetermined time in the communication by communication I/F unit 112. The setting as an active device for portable information device 200 is reset if the communication path has been cut off, thereby avoiding a state in which MFP 100 is remotely operated for a long time by the user who operates portable information device 200.

MFP 100 detects an end state when the number of jobs executed through a remote operation received from portable information device 200 set as an active device is an upper limit value or greater. The number of jobs executed through a remote operation received from portable information device 200 set as an active device is limited, thereby avoiding a state in which MFP 100 is remotely operated for a long time by portable information device 200.

The upper limit value is changed based on the setting time taken to set a setting value for executing a job through a remote operation received from portable information device 200 set as an active device. For example, if the setting time is equal to or longer than a predetermined time, the upper limit value is reduced. This can prevent the total time for the user who operates portable information device 200 to remotely operate MFP 100 to execute a plurality of jobs from becoming long.

Portable information devices 200A and 200B set as standby devices are each notified of the remaining number of jobs executable through a remote operation received from portable information device 200 set as an active device. The users who operate portable information devices 200A, 200B set as standby devices thus can know the remaining number of jobs executable through a remote operation by portable information device 200. The users who operate portable information devices 200A, 200B can predict the time taken until the remote operation by portable information device 200 is finished.

MFP 100 detects an end state when no remote operation is received from portable information device 200 set as an active device for a predetermined upper limit time or longer. However, even if the time during which portable information device 200 set as an active device is set as an active device is equal to or longer than the upper limit value, MFP 100 does not detect an end state until at least one job is executed through a remote operation received from portable information device 200 set as an active device. This avoids a state in which MFP 100 is remotely operated by portable information device 200 for an indefinite time, for example, when the user who operates portable information device 200 forgets to input an instruction to terminate the remote operation. The time taken to set a setting value may sometimes exceed the upper limit time. In this case, execution of at least one job is allowed, so that the job can be executed through a remote operation.

<Modification>

In print system 1 in the foregoing embodiment, MFP 100 maintains the communication path established with a remote operation device without cutting it off, while the remote operation device is being set as a standby device. A print system 1A in a modification differs from print system 1 described above in that MFP 100 cuts off the communication path established with a remote operation device while the remote operation device is being set as a standby device. The difference of print system 1A in the modification from the foregoing print system 1 will be mainly described below.

Figure 13:
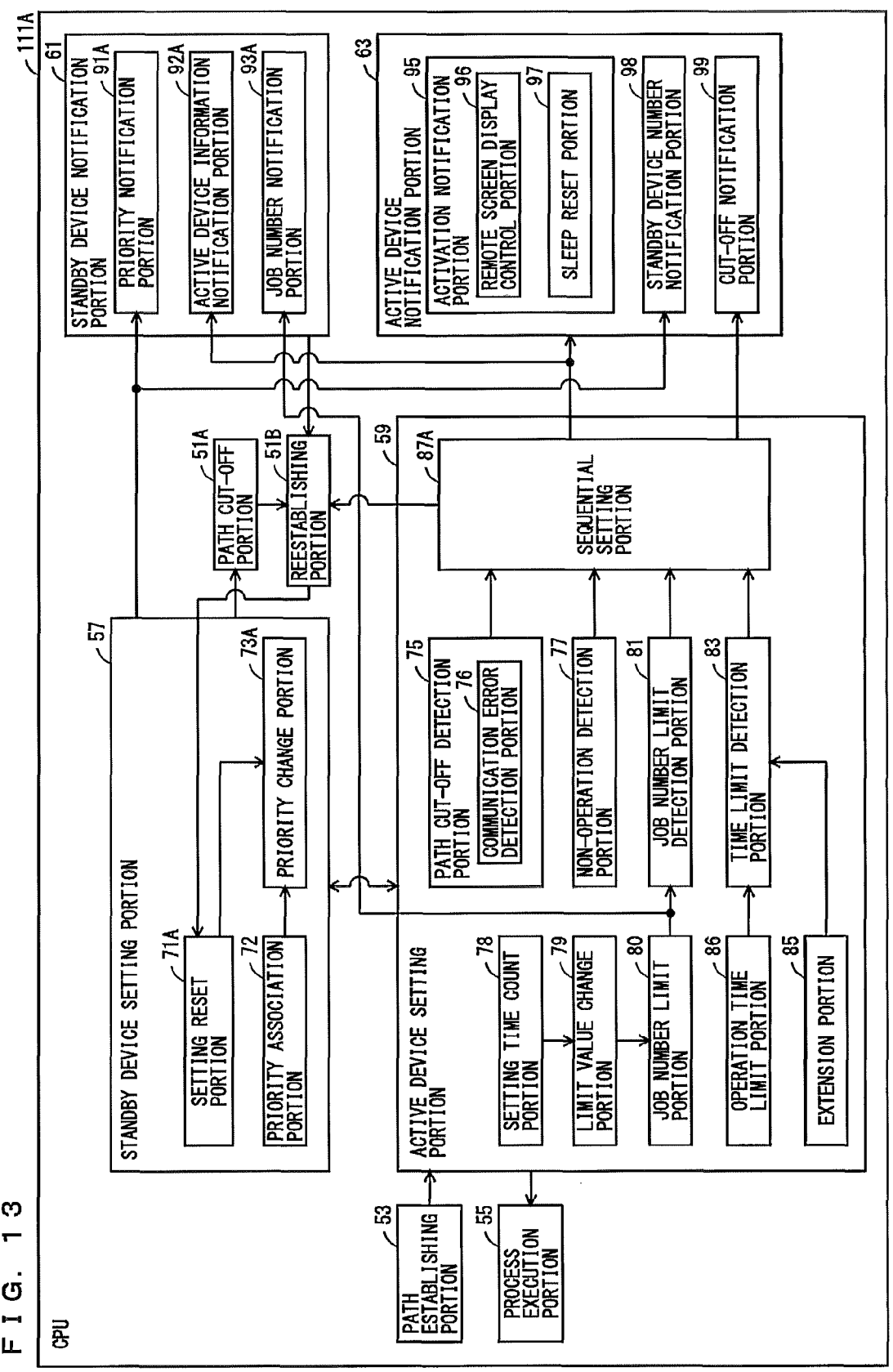
FIG. 13 is a block diagram showing an example of functions of the CPU of the MFP in a modification.

FIG. 13 is a block diagram showing an example of functions of the CPU of the MFP in a modification. The functions shown in FIG. 13 differ from the functions shown in FIG. 5 in that path maintaining portion 51 is deleted, a path cut-off portion 51A and a reestablishing portion 51B are added, and setting reset portion 71, priority change portion 73, sequential setting portion 87, priority notification portion 91, active device information notification portion 92, and job number notification portion 93 are changed to setting reset portion 71A, priority change portion 73A, sequential setting portion 87A, priority notification portion 91A, active device information notification portion 92A, and job number notification portion 93A, respectively. The other functions are the same as the functions shown in FIG. 5 and a description thereof will not be repeated here.

In response to input of a set of device identification information and a session number from active device setting portion 59, standby device setting portion 57 sets the remote operation device specified by the device identification information as a standby device and notifies the remote operation device specified by the device identification information that it has been set as a standby device. Communication I/F unit 112 is controlled so that a signal indicating that the remote operation device has been set as a standby device is transmitted through the communication path specified by the session number input from active device setting portion 59. The number of standby devices that can be set by standby device setting portion 57 is one or more. Standby device setting portion 57 outputs a set of the device identification information and the session number of the remote operation device set as a standby device to path maintaining portion 51. The set of the device identification information and the session number of the remote operation device set as a standby device is also output to path cut-off portion 51A.

Path cut-off portion 51A controls communication I/F unit 112 to cut off the communication path identified by the session number in response to input of a set of the device identification information and the session number of the standby device that is input from standby device setting portion 57, and outputs the device identification information of the standby device to reestablishing portion 51B. Specifically, communication I/F unit 112 is controlled so that a signal indicating the communication line will be cut off is transmitted through the communication path specified by the session number input from standby device setting portion 57.

Reestablishing portion 51B receives the device identification information of a standby device from path cut-off portion 51A and establishes a communication path with the remote operation device specified by the received device identification information. When communication I/F unit 112 receives a connection request from a remote operation device, if the same device identification information as the device identification information of the remote operation device has been input from path cut-off portion 51A, reestablishing portion 51B establishes a communication path with the remote operation device. When a communication path with the remote operation device is established, reestablishing portion 51B outputs a set of the device identification information and the session number of the remote operation device to setting reset portion 71.

When receiving a cancel instruction from the remote operation device set as a standby device, setting reset portion 71A resets the setting as a standby device for the remote operation device that has transmitted the cancel instruction. Specifically, setting reset portion 71A determines that, of communication packets received by communication I/F unit 112, a communication packet having the same session number as the session number input from reestablishing portion 51B is the communication packet transmitted by the remote operation device set as a standby device. Setting reset portion 71A specifies a cancel instruction based on the communication packet transmitted by the remote operation device set as a standby device. If a cancel instruction is specified, setting reset portion 71A resets the setting as a standby device for the remote opera lion device that has transmitted the cancel instruction. Specifically, of device identification information of standby devices stored in RAM 114, the device identification information of the remote operation device that has transmitted the cancel instruction is erased.

In response to input of an active setting signal described later from active device setting portion 59, setting reset portion 71A resets the setting as a standby device for the remote operation device specified by the device identification information included in the active setting signal. The active setting signal is a signal indicating that the remote operation device specified by the device identification information included therein is set as an active device. If the setting as a standby device is reset, setting reset portion 71A outputs a reset signal to priority change portion 73A. The reset signal includes the device identification information of the remote operation device reset from the setting as a standby device.

If a reset signal is input from setting reset portion 71, priority change portion 73A deletes the priority associated with the remote operation device specified by the device identification information included in the reset signal and raises the priority one level for the remote operation device with the priority set lower than the deleted priority.

Every time a remote operation device is set as a standby device or every time the priority associated with the remote operation device set as a standby device is changed, standby device setting portion 57 outputs the device identification information of each remote operation device set as a standby device to standby device notification portion 61 and active device notification portion 63 and outputs a set of the device identification information and the priority of each remote operation device set as a standby device to active device setting portion 59.

Sequential setting portion 87A included in active device setting portion 59 detects an end state in which no remote operation is received from the remote operation device set as an active device if a setting instruction is input from any one of path cut-off detection portion 75, non-operation detection portion 77, job number limit detection portion 81, and time limit detection portion 83. When an end state is detected, sequential setting portion 87A resets the setting for the remote operation device set as an active device and sets the remote operation device set as a standby device to be an active device. Sequential setting portion 87A receives a set of device identification information and priority of each remote operation device set as a standby device from standby device setting portion 57. When an end state is detected, sequential setting portion 87A sets the remote operation device specified by the device identification information with the highest priority to be an active device, based on the set of device identification information and priority input from standby device setting portion 57. When the remote operation device with the highest priority of the remote operation devices set as standby devices is set as an active device, sequential setting portion 87A outputs a reestablishing instruction to reestablishing portion 51B and acquires a session number from reestablishing portion 51B. The reestablishing instruction includes the device identification information of the remote operation device with the highest priority of the remote operation devices set as standby devices.

In response to input of a reestablishing instruction, reestablishing portion 51B establishes a communication path with the remote operation device specified by the device identification information included in the reestablishing instruction. A communication path is established by transmitting a connection request to the remote operation device through communication I/F unit 112 and negotiating with the remote operation device. When a communication path is established with the remote operation device specified by the device identification information included in the reestablishing instruction, reestablishing portion 51B outputs a set of the device identification information and the session number of the communication path to sequential setting portion 87A.

When a setting instruction is input from any one of non-operation detection portion 77, job number limit detection portion 81, and time limit detection portion 83, sequential setting portion 87A outputs a cut-off result signal including a set of the device identification information and the session number of the remote operation device set as an active device to active device notification portion 63.

Standby device notification portion 61 receives the device identification information of each remote operation device set as a standby device from standby device setting portion 57 and receives a set of the device identification information and the session number of the remote operation device set as an active device from sequential setting portion 87A in active device setting portion 59. Standby device notification portion 61 includes priority notification portion 91A, active device information notification portion 92A, and job number notification portion 93A.

Every time standby device setting portion 57 sets a remote operation device as a standby device or every time the priority associated with the remote operation device set as a standby device is changed, priority notification portion 91A receives a set of the device identification information and the priority of each remote operation device set as a standby device. Priority notification portion 91A notifies each remote operation device set as a standby device of the priority. Specifically, priority notification portion 91A outputs a reestablishing instruction including the device identification information input from standby device setting portion 57 to reestablishing portion 51B and acquires a session number from reestablishing portion 51B. Priority notification portion 91A controls communication I/F unit 112 to transmit the input priority through the communication path having the acquired session number. The remote operation device receiving the priority displays the number of remote operation devices set as standby devices that is calculated from the priority, so that the user who operates the remote operation device can know the number of waiting devices and thus predict the time taken until the remote operation becomes enabled.

Active device information notification portion 92A notifies each remote operation device set as a standby device of the remote operation device set as an active device. Specifically, active device information notification portion 92A outputs a reestablishing instruction including the device identification information input from standby device setting portion 57 to reestablishing portion 51B and acquires a session number from reestablishing portion 51B. In response to input of a reestablishing instruction from active device information notification portion 92A, reestablishing portion 51B establishes a communication path with the remote operation device specified by the device identification information included in the reestablishing instruction and outputs a set of the device identification information and the session number of the communication path to active device information notification portion 92A. Active device information notification portion 92A controls communication I/F unit 112 to transmit the device identification information of the remote operation device set as an active device through the communication path having the session number input from reestablishing portion 51B.

Job number notification portion 93A receives the remaining number of executable jobs from job number limit portion 80. Job number notification portion 93A notifies each remote operation device set as a standby device of the remaining number of jobs executable by the remote operation device set as an active device. Specifically, job number notification portion 93A outputs a reestablishing instruction including the device identification information input from standby device setting portion 57 to reestablishing portion 51B and acquires a session number from reestablishing portion 51B. In response to input of a reestablishing instruction from job number notification portion 93A, reestablishing portion 51B establishes a communication path with the remote operation device specified by the device identification information included in the reestablishing instruction and outputs a set of the device identification information and the session number of the communication path to job number notification portion 93A. Job number notification portion 93A controls communication I/F unit 112 to transmit the remaining number of jobs input from job number limit portion 80 through the communication path having the session number input from reestablishing portion 51B.

Figure 14:
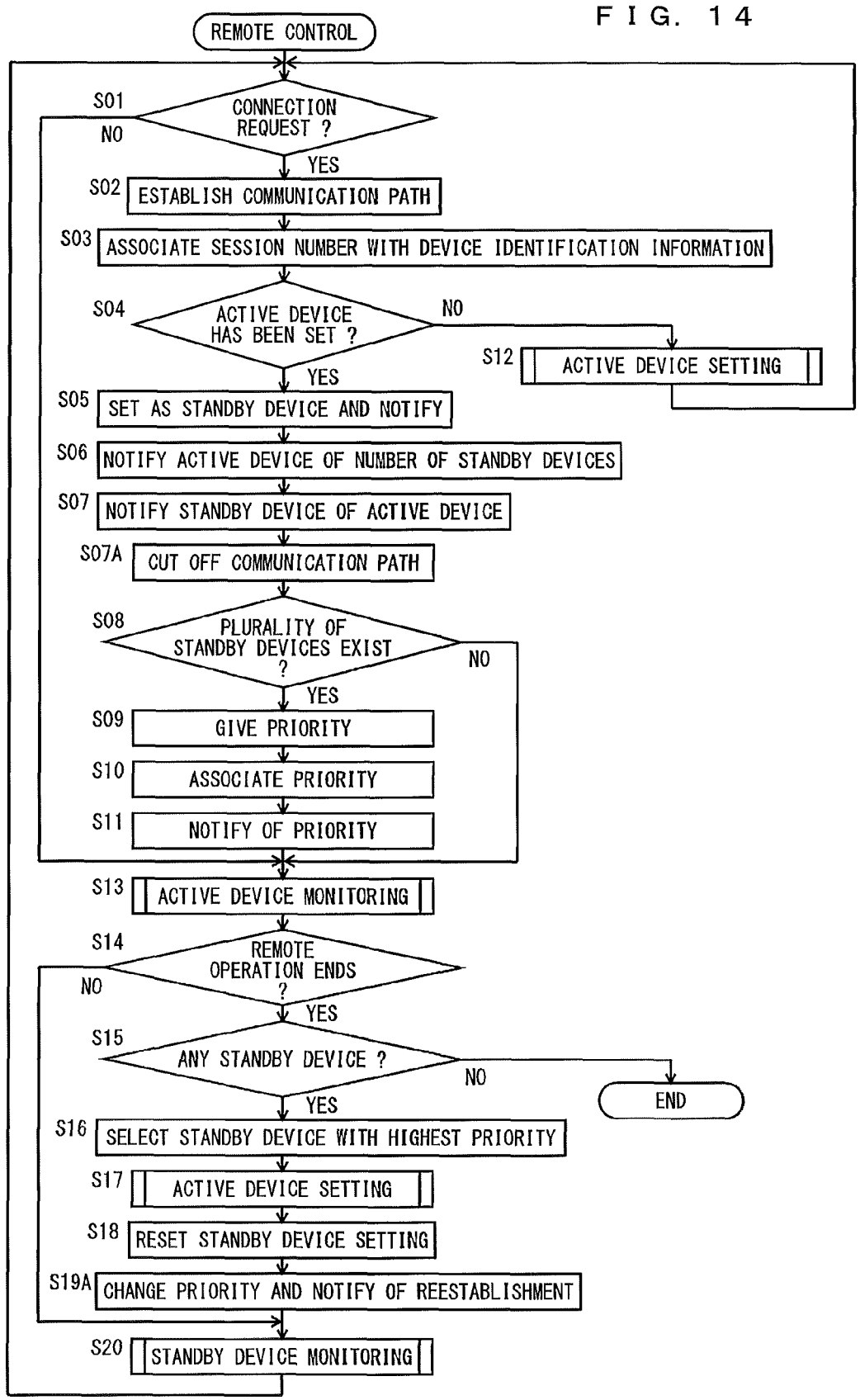
FIG. 14 is a flowchart showing an example of the procedure of a remote control process in the modification.

FIG. 14 is a flowchart showing an example of the procedure of the remote control process in the modification. This process differs from the remote control process shown in FIG. 7 in that step S07A is added between step S07 and step S08 and step S19 is changed to step S19A. The other processing is the same as the processing shown in FIG. 7 and a description thereof is not repeated here.

In step S07A, the communication path established in step S02 is cut off, and the process proceeds to step S08. When the process proceeds to step S07A, the remote operation device that has transmitted the connection request received in step S01 is set as a standby device in step S05. In step S07A, therefore, the communication path established with the remote operation device set as a standby device is cut off.

In step S19A, the priority is changed, and the standby device is notified of the changed priority. The priority corresponding to the standby device is transmitted. The device identification information and the priority of the remote operation device set as a standby device is stored in RAM 114, and the stored priority associated with the standby device is changed. The standby device is then specified based on the device identification information of the remote operation device set as a standby device that is stored in RAM 114. A communication path corresponding to the specified standby device is established. After the priority corresponding to the specified standby device is transmitted through the established communication path, the communication path is cut off. When a plurality of device identification information of the remote operation devices set as standby devices is stored in RAM 114, the remaining number of jobs is transmitted all of the standby devices.

Figure 15:
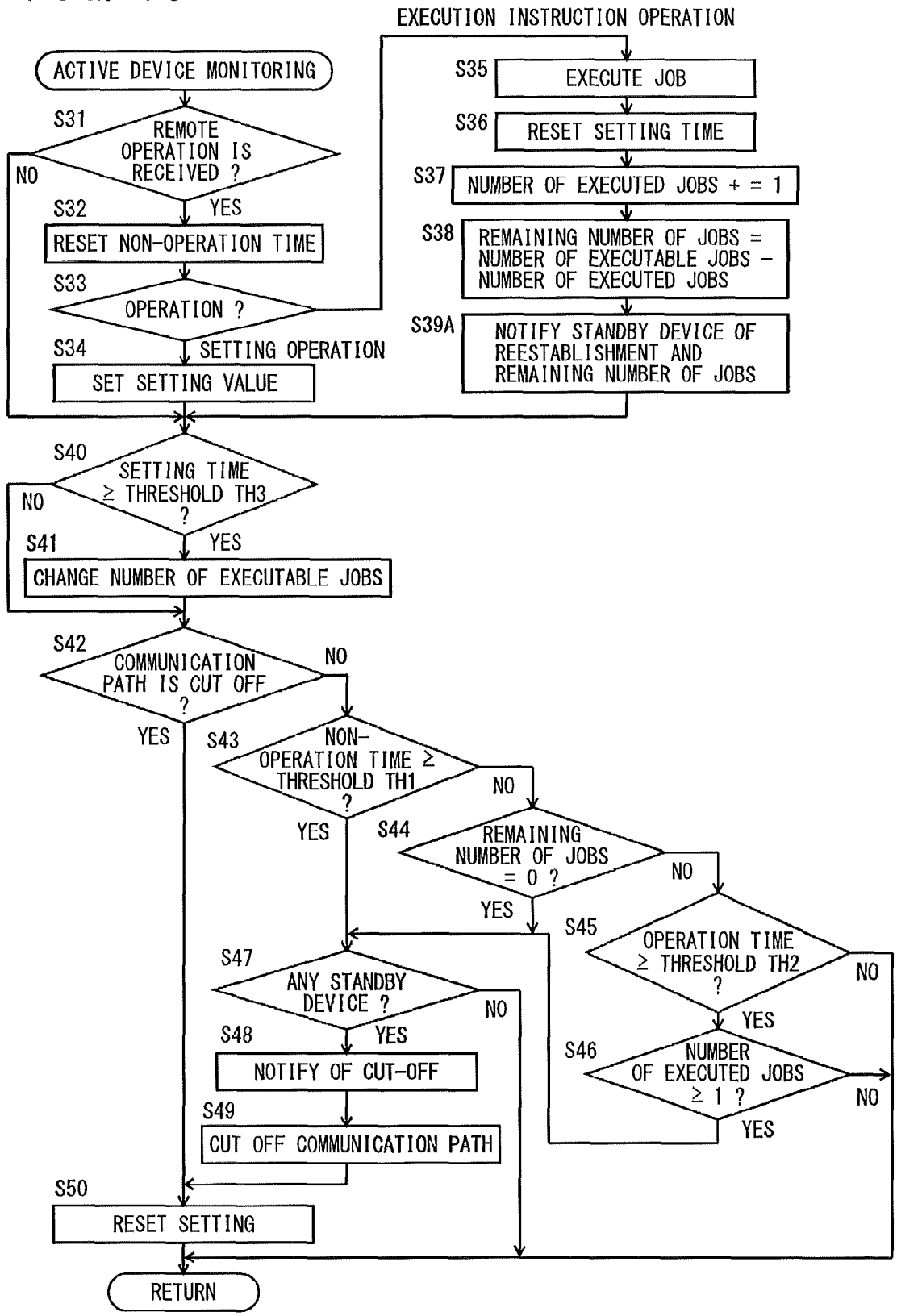
FIG. 15 is a flowchart showing an example of the procedure of an active device monitoring process in the modification.

FIG. 15 is a flowchart showing an example of the procedure of the active device monitoring process in the modification. This process differs from the active device monitoring process shown in FIG. 10 in that step S39 is changed to step S39A. The other processing is the same as the processing shown in FIG. 10 and a description thereof is not repeated here. In step S39A, a communication path with the standby device is reestablished, and the standby device is notified of the remaining number of jobs. The process then proceeds to step S40. Communication I/F unit 112 is controlled so that a communication path is reestablished with the standby device, and the remaining number of jobs calculated in step S38 is transmitted through the reestablished communication path. The communication path is thereafter cut off. When a plurality of device identification information of the remote operation devices set as standby devices is stored in RAM 114, the remaining number of jobs is transmitted to all of the standby devices.

Figure 16:
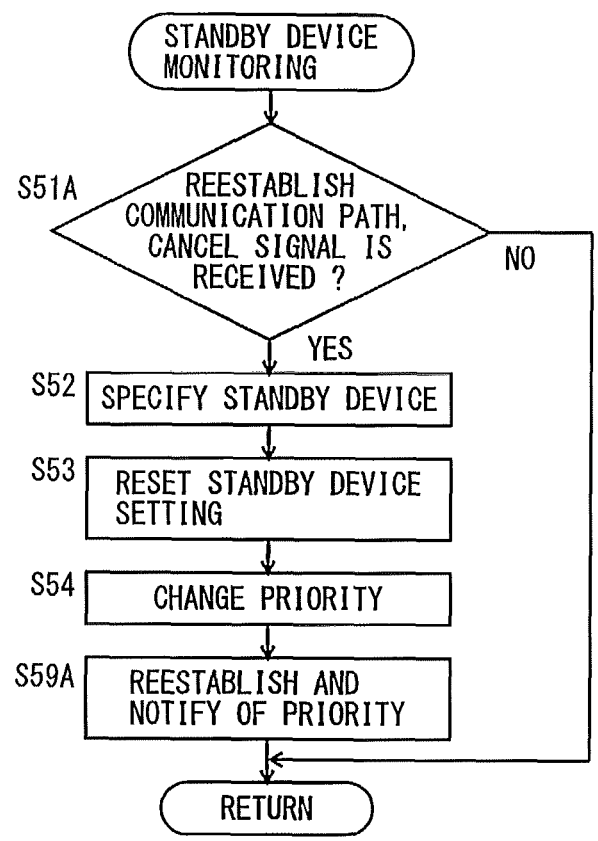
FIG. 16 is a flowchart showing an example of the procedure of a standby device monitoring process in the modification.

FIG. 16 is a flowchart showing an example of the procedure of a standby device monitoring process in the modification. This process differs from the standby device monitoring process shown in FIG. 11 in that step S51 and step S59 are changed to step S51A and step S59A, respectively, and steps S55 to S58 are deleted. The other processing is the same as the processing shown in FIG. 11 and a description thereof is not repeated here.

In step S51A, a communication path is reestablished, and it is determined whether a cancel signal has been received (step S51). When a connection request is received from a remote operation device set as a standby device, among communication packets received by communication I/F unit 112, a communication path is reestablished, and it is determined whether a cancel signal has been received through the communication path. If a cancel signal has been received, the process proceeds to step S52. If not, the process returns to the remote control process.

In step S59A, a communication path is reestablished with the standby device, and the standby device is notified of the changed priority. The process then returns to the remote control process. Communication I/F unit 112 is controlled so that a communication path with the standby device is reestablished, and the priority changed in step S54 is transmitted through the reestablished communication path. The communication path is thereafter cut off. When a plurality of device identification information of remote operation devices set as standby devices is stored in RAM 114, the corresponding priority is transmitted to each of the standby devices.

MFP 100 in the modification cuts off the communication path established with portable information device 200A in response to portable information device 200A being set as a standby device and cuts off the communication path established with portable information device 200B in response to portable information device 200B being set as a standby device. This eliminates the need for executing a process for maintaining a communication path, leading to effective use of network resources.

In the foregoing embodiment, MFP 100 has been described as an example of the image forming apparatus and portable information devices 200, 200A, 200B have been described as an example of the remote operation device. However, it is needless to say that the present invention can be understood as a remote control method allowing MFP 100 to execute the process shown in FIG. 8 to FIG. 11 or FIG. 14 to FIG. 16 and a remote control program allowing CPU 111 of MFP 100 to perform the remote control method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
   a hardware processor configured to:
   in response to a connection request being received from a remote operation device, establish a communication path with the remote operation device;
   set the remote operation device with which the communication path is established to be an active device;
   cause the image forming apparatus to execute a process in accordance with a remote operation received from the remote operation device set as an active device;
   in response to a communication path being established with another remote operation device different from the remote operation device set as an active device, set another remote operation device different from the remote operation device set as an active device to be a standby device;
   in response to detection of an end state in which no remote operation is received from the remote operation device set as an active device, set the remote operation device set as a standby device to be an active device;
   set a number of jobs executable through a remote operation received from the remote operation device set as an active device to a set number of executable jobs;
   detect an end state when the number of jobs executed through a remote operation received from the remote operation device set as an active device becomes equal to or greater than the set number of executable jobs; and
   transmit to the standby device a numerical value representing the number of executable jobs remaining under the number of executable jobs set for the active device.

2. The image forming apparatus according to claim 1, wherein the hardware processor is further configured to, in response to the remote operation device set as a standby device being set as an active device, notify the remote operation device newly set as an active device that a remote operation is enabled.

3. The image forming apparatus according to claim 2, wherein the hardware processor is further configured to allow the remote operation device set as an active device to display a remote operation screen.

4. The image forming apparatus according to claim 2, wherein the hardware processor is further configured to reset a sleep mode if the remote operation device set as an active device is in the sleep mode.

5. The image forming apparatus according to claim 1, wherein the hardware processor is further configured to notify the remote operation device set as a standby device of device identification information for identifying the remote operation device set as an active device.

6. The image forming apparatus according to claim 1, wherein the hardware processor is further configured to notify the remote operation device set as an active device of the number of remote operation devices set as standby devices.

7. The image forming apparatus according to claim 1, wherein the hardware processor is further configured to, if a plurality of remote operation devices are set as standby devices, associate priorities with the remote operation devices set as standby devices, wherein
   the hardware processor is further configured to set one of the remote operation devices set as standby devices that has the highest priority to be an active device.

8. The image forming apparatus according to claim 7, wherein the hardware processor is further configured to maintain the communication path established with the remote operation device set as a standby device by the hardware processor until the remote operation device set as a standby device is set as an active device, wherein
   the hardware processor is further configured to change the priority associated to the lowest priority for a remote operation device corresponding to a communication path having a communication error continuing for a predetermined time, among a plurality of communication paths maintained for a plurality of remote operation devices set as standby devices.

9. The image forming apparatus according to claim 1, wherein the hardware processor is further configured to, if a cancel instruction is received from the remote operation device set as a standby device, reset a setting as a standby device for the remote operation device that has transmitted the cancel instruction.

10. The image forming apparatus according to claim 1, wherein the hardware processor is further configured to maintain the communication path established with the remote operation device set as a standby device by the hardware processor until the remote operation device set as a standby device is set to be an active device.

11. The image forming apparatus according to claim 1, wherein the hardware processor is further configured to, in response to a standby device being set, cut off the communication path established with the remote operation device set as a standby device, wherein
the hardware processor is configured to, in response to the remote operation device set as a standby device being set to be an active device, establish a communication path with the remote operation device set as an active device.

12. The image forming apparatus according to claim 1, wherein the hardware processor is further configured to detect, as the end state, a state in which the communication path established with the remote operation device set as an active device is cut off.

13. The image forming apparatus according to claim 12, wherein the hardware processor is further configured to detect a state in which the communication path is cut off if a communication error continues for a predetermined time or longer in the communication path established with the remote operation device set as an active device.

14. The image forming apparatus according to claim 1, wherein the hardware processor is further configured to detect the end state if no remote operation is received from the active device continuously for a predetermined time.

15. An image forming apparatus comprising:
a hardware processor configured to:
in response to a connection request being received from a remote operation device, establish a communication path with the remote operation device;
set the remote operation device with which the communication path is established to be an active device;
cause the image forming apparatus to execute a process in accordance with a remote operation received from the remote operation device set as an active device;
in response to a communication path being established with another remote operation device different from the remote operation device set as an active device, set another remote operation device different from the remote operation device set as an active device to be a standby device;
in response to detection of an end state in which no remote operation is received from the remote operation device set as an active device, set the remote operation device set as a standby device to be an active device;
limit a number of jobs executable through a remote operation received from the remote operation device set as an active device;
detect an end state when the number of jobs executed through a remote operation received from the remote operation device set as an active device becomes equal to or greater than a set upper limit value;
count a time during which a setting value for executing a job to be executed by the image forming apparatus is set through a remote operation received from the remote operation device set as an active device, and
change the set upper limit value based on the counted setting time.

16. An image forming apparatus comprising:
a hardware processor configured to:
in response to a connection request being received from a remote operation device, establish a communication path with the remote operation device;
set the remote operation device with which the communication path is established to be an active device;
cause the image forming apparatus to execute a process in accordance with a remote operation received from the remote operation device set as an active device;
in response to a communication path being established with another remote operation device different from the remote operation device set as an active device, set another remote operation device different from the remote operation device set as an active device to be a standby device;
in response to detection of an end state in which no remote operation is received from the remote operation device set as an active device, set the remote operation device set as a standby device to be an active device;
limit a time during which a remote operation device is set as an active device;
detect an end state when the time during which the remote operation device set as an active device is being set as an active device becomes equal to or greater than a set upper limit value; and
prohibit limitation of the time during which the remote operation device is set as an active device until the image forming apparatus executes at least one job through a remote operation received from the remote operation device set as an active device, even if the time during which the remote operation device set as an active device is being set as an active device is equal to or greater than the set upper limit value.

17. A remote control method performed in an image forming apparatus, the method allowing the image forming apparatus to perform:
a path establishing step of, in response to a connection request being received from a remote operation device, establishing a communication path with the remote operation device;
an active device setting step of setting the remote operation device with which the communication path is established to be an active device;
a process execution step of executing a process in accordance with a remote operation received from the remote operation device set as an active device; and
a standby device setting step of, in response to a communication path being established in the path establishing step with another remote operation device different from the remote operation device set as an active device, setting another remote operation device different from the remote operation device set as an active device to be a standby device,
the active device setting step including a sequential setting step of, in response to detection of an end state in which no remote operation is received from the remote operation device set as an active device, setting the remote operation device set as a standby device to be an active device;
a setting step of limiting the number of jobs executable through a remote operation received from the remote operation device set as an active device to a set number of executable jobs;
the setting step including a detecting step of detecting an end state when the number of jobs executed through a remote operation received from the remote operation device set as an active device becomes equal to or greater than the set number of executable jobs; and a transmitting step of transmitting to the standby device a numerical value representing the number of executable jobs remaining under the number of executable jobs set for the active device.

18. A non-transitory computer-readable recording medium encoded with a remote control program executed by a computer controlling an image forming apparatus, the remote control program causing the computer to perform the remote control method of claim 17.

19. A remote control method performed in an image forming apparatus, the method allowing the image forming apparatus to perform:
- a path establishing step of, in response to a connection request being received from a remote operation device, establishing a communication path with the remote operation device;
- an active device setting step of setting the remote operation device with which the communication path is established to be an active device;
- a process execution step of executing a process in accordance with a remote operation received from the remote operation device set as an active device; and
- a standby device setting step of, in response to a communication path being established in the path establishing step with another remote operation device different from the remote operation device set as an active device, setting another remote operation device different from the remote operation device set as an active device to be a standby device,
- the active device setting step including a sequential setting step of, in response to detection of an end state in which no remote operation is received from the remote operation device set as an active device, setting the remote operation device set as a standby device to be an active device;
- a job number limiting step of limiting the number of jobs executable through a remote operation received from the remote operation device set as an active device;
- the job number limiting step including a detecting step of detecting an end state when the number of jobs executed through a remote operation received from the remote operation device set as an active device becomes equal to or greater than a set upper limit value;
- a setting time count step of counting a time during which a setting value for executing a job to be executed by the image forming apparatus is set through a remote operation received from the remote operation device set as an active device; and
- a limit value changing step of changing an upper limit value based on the counted setting time.

20. A non-transitory computer-readable recording medium encoded with a remote control program executed by a computer controlling an image forming apparatus, the remote control program causing the computer to perform the remote control method of claim 19.

21. A remote control method performed in an image forming apparatus, the method allowing the image forming apparatus to perform:
- a path establishing step of, in response to a connection request being received from a remote operation device, establishing a communication path with the remote operation device;
- an active device setting step of setting the remote operation device with which the communication path is established to be an active device;
- a process execution step of executing a process in accordance with a remote operation received from the remote operation device set as an active device; and
- a standby device setting step of, in response to a communication path being established in the path establishing step with another remote operation device different from the remote operation device set as an active device, setting another remote operation device different from the remote operation device set as an active device to be a standby device,
- the active device setting step including a sequential setting step of, in response to detection of an end state in which no remote operation is received from the remote operation device set as an active device, setting the remote operation device set as a standby device to be an active device;
- an operation time limiting step of limiting a time during which a remote operation device is set as an active device;
- a time limit detecting step of detecting an end state when the time during which the remote operation device set as an active device is being set as an active device becomes equal to or greater than a set upper limit value; and
- a prohibiting step of prohibiting limitation of the time during which a remote operation device is set as an active device until the image forming apparatus executes at least one job through a remote operation received from the remote operation device set as an active device, even if the time during which the remote operation device set as an active device is being set as an active device is equal to or greater than the set upper limit value.

22. A non-transitory computer-readable recording medium encoded with a remote control program executed by a computer controlling an image forming apparatus, the remote control program causing the computer to perform the remote control method of claim 21.

* * * * *